United States Patent [19]
Hendrickson et al.

[11] Patent Number: 6,125,139
[45] Date of Patent: *Sep. 26, 2000

[54] NARROWBAND DIGITAL CORDLESS TELEPHONE

[75] Inventors: Alan Hendrickson; Paul Schnizlein; Jacqueline Mullins; Peter E. Sheldon, all of Austin, Tex.

[73] Assignee: Advanced Micro Devices, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/760,883

[22] Filed: Dec. 6, 1996

Related U.S. Application Data

[63] Continuation-in-part of application No. 08/581,265, Dec. 29, 1995, abandoned.

[51] Int. Cl.[7] .............................. H04B 7/26; H04M 11/06
[52] U.S. Cl. .......................... 375/220; 375/244; 455/426; 455/511; 455/524
[58] Field of Search ..................................... 455/557, 403, 455/422, 420, 511, 517, 524, 77, 76, 84; 375/372, 219, 220, 244; 4/132; 379/106.03, 368

[56] References Cited

U.S. PATENT DOCUMENTS

| | | |
|---|---|---|
| 4,286,177 | 8/1981 | Hart et al. . |
| 4,502,038 | 2/1985 | Lowenthal et al. ........................ 341/26 |
| 4,550,425 | 10/1985 | Andersen et al. . |
| 4,714,842 | 12/1987 | Hart et al. . |
| 4,777,633 | 10/1988 | Fletcher et al. . |
| 4,928,306 | 5/1990 | Biswas et al. . |
| 4,979,071 | 12/1990 | Ito et al. . |
| 5,031,209 | 7/1991 | Thornborough et al. .......... 379/106.03 |
| 5,151,554 | 9/1992 | Matsuda ................... 884/655 |
| 5,163,153 | 11/1992 | Cole et al. . |
| 5,204,986 | 4/1993 | Ito et al. . |
| 5,297,203 | 3/1994 | Rose et al. ................ 379/61 |
| 5,347,480 | 9/1994 | Asghar et al. . |
| 5,384,807 | 1/1995 | Yatim et al. . |
| 5,408,520 | 4/1995 | Clark et al. . |
| 5,428,664 | 6/1995 | Kobayashi . |
| 5,467,383 | 11/1995 | Urasaka et al. . |
| 5,517,553 | 5/1996 | Sato . |
| 5,524,044 | 6/1996 | Takeda . |
| 5,524,046 | 6/1996 | Paniccia, Jr. . |
| 5,524,047 | 6/1996 | Brown et al. . |
| 5,535,432 | 7/1996 | Dent .......................................... 455/77 |
| 5,555,287 | 9/1996 | Gulick et al. ............................ 455/557 |

FOREIGN PATENT DOCUMENTS

| | | | |
|---|---|---|---|
| 404051742 | 2/1992 | Japan ....................................... 379/61 |

Primary Examiner—Young T. Tse

[57] ABSTRACT

A digital cordless telecommunications unit that serves for communications when paired with a similar unit and connected with a network is disclosed. The unit receives analog receive voice signals and transmits analog transmit voice signals. In addition, the unit transmits digital baseband transmit signals and receives digital formatted baseband receive signals. The unit includes a baseband chip, as well as an audio functions circuit and a system control functions circuit. The audio functions circuit comprises an audio front end for receiving the analog receive voice signals and transmitting the analog transmit voice signals, and an adaptive differential pulse code modulator codec, connected to the audio front end, for converting the analog receive voice signals to the digital transmit signals and converting the digital formatted baseband receive signals to the analog transmit voice signals. The system control functions circuit comprises a microcontroller, connected to the codec, for controlling the baseband chip, a memory accessible by the microcontroller for storing control instructions, an interrupt controller connected to the microcontroller, a parallel port connected to the interrupt controller, a wake-up timer connected to the interrupt controller, a clock generator connected to the microcontroller, and a synchronous serial port connected to the interrupt controller.

22 Claims, 13 Drawing Sheets

NARROWBAND DIGITAL CORDLESS TELEPHONE

This application is a continuation-in-part of application Ser. No. 08/581,265, entitled "Narrowband Digital Cordless Telephone", filed Dec. 29, 1995, now abandoned.

BACKGROUND OF THE INVENTION

The invention relates to electronic communications and, more particularly, to a narrowband digital cordless telephone baseband chip for use in a hand set unit or base set unit of a digital cordless telephone.

Typical cordless telephones are generally known in the art. Advances in cordless telephony are continually being made, however, and those advances are often significant. Certain types of cordless telephones may operate digitally. Those digital cordless telephones may provide greater quality and capabilities than analog devices.

Cordless telephones are popular with individual consumers. As cordless telephone technology advances, cordless telephones may prove advantageous to businesses and commercial groups. When cordless telephones are designed for the lower-end individual consumer market, small size and quality are primary considerations of those consumers. Digital telephones tend to provide greater quality of sounds and capabilities than analog telephones. It is desirable, therefore, that a digital cordless telephone of good quality and adequate capabilities be available.

Beyond the expectation of quality, individual cordless telephone users must typically operate within a narrow bandwidth. Such a narrow bandwidth presents problems that must be addressed by digital cordless telephone designers. For example, within the narrow bandwidth, multiple users may need to simultaneously communicate. In order to avoid interference among users and inaccurate communications in those cases, designs of digital cordless telephones must account for this multiple user scenario. This is complicated by the fact that those designs must also meet requirements of the market, such as size and quality.

SUMMARY OF THE INVENTION

The preferred embodiment of the invention is a digital cordless telecommunications unit for receiving analog receive voice signals and transmitting analog transmit voice signals. In addition, the unit transmits digital baseband transmit signals and receives digital formatted baseband receive signals. The unit includes a baseband chip, as well as an audio functions circuit, and a system control functions circuit. The audio functions circuit comprises an audio front end for receiving the analog receive voice signals and transmitting the analog transmit voice signals, and an adaptive differential pulse code modulator codec, connected to the audio front end, for converting the analog receive voice signals to the digital transmit signals and converting the digital formatted baseband receive signals to the analog transmit voice signals. The system control functions circuitry comprises a microcontroller, connected to the codec, for controlling the baseband chip, a memory accessible by the microcontroller for storing control instructions, an interrupt controller connected to the microcontroller, a parallel port connected to the interrupt controller, a wake-up timer connected to the interrupt controller, a clock generator connected to the microcontroller, and a synchronous serial port connected to the interrupt controller.

The present invention overcomes many problems of the prior technology., and presents numerous advantages. Particularly, the invention provides small size, quality, and also enables desired communications over narrow bandwidth. It is clear, therefore, that the invention is a significant improvement and advance in the art and technology.

DESCRIPTION OF THE PREFERRED EMBODIMENTS

Figure 1:
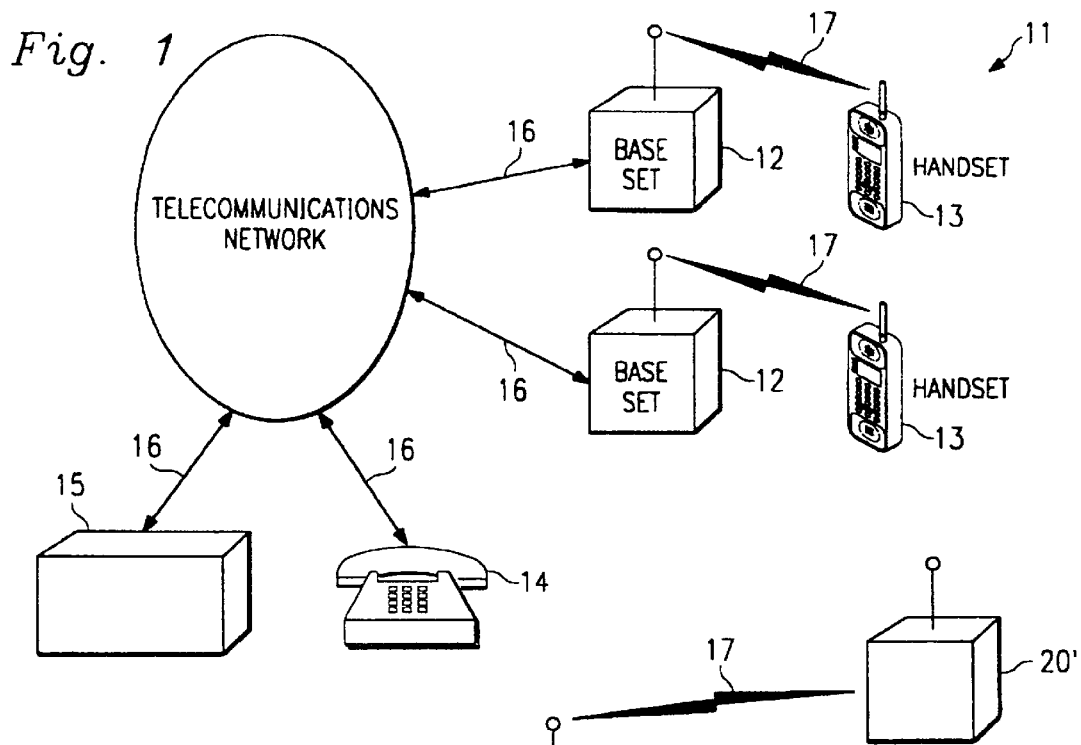
FIG. 1 is a schematic view of a telecommunication system connected with several communications units, including a base unit and hand unit of a digital cordless telephone.

Referring to FIG. 1, several telecommunications devices are connected to and form a telecommunications system 11. The telecommunications system 11 is a PSTN (Public Switched Telephone Network), although an ISDN (Integrated Services Digital Network) or other network may also be used. The telecommunications system 11 includes base units 12 of two digital cordless telephones, wire-linked with other portions of the telecommunications system 11. Each of the base units 12 has a particular hand unit 13 with which the base unit 12 is in radio frequency (RF) communication. The telecommunications system 11 includes a typical corded telephone 14, and another telecommunications device 15, which may be, for example, a communications device such as a facsimile machine, a modem for a computer, or some other such device. Each of the devices is connected to the telecommunications system 11 by a network link 16, which is a wired-link, but alternatively could be an optical fiber link, a long-distance radio link, or some other communications link.

The Digital Cordless Telephone

Referring to FIG. 1, the hand unit 13 has greater mobility. than the corded telephone 14, the communications device 15, and the base unit 12. This is so because the hand unit 13 is mobile with respect to the base unit 12 and is unimpeded by a fixed physical length connector such as the link 16. Instead of such a connector, communications between the base unit 12 and the hand unit 13 occur over the RF ("radio frequency") link 17. Although there are typically distance limits to capabilities of communication over the RF link 17, the RF communications between the base unit 12 and the hand unit 13 over the RF link 17 may generally be accomplished at greater and varied distances between the base unit 12 and the hand unit 13 in comparison to the fixed physical length connector employed as the network link 16 in other types of devices. Such an RF link 17 between the base unit 12 and the hand unit 13, versus some other physical network link 16, such as a fixed length wire, thus, provides much greater flexibility of use of the hand unit 13 at varied locations during communications.

Alternate embodiments of the present invention include multiple hand units 13 communicating with a single base unit 12, office branch exchanges or intercom systems with multiple hand units 13 communicating with one or more base units 12, and others. Although the preferred embodiment of the present invention is described primarily in reference to a configuration of one base unit 12 with a network 12 being dedicated to a single hand unit 13, and vice-a-versa, the descriptions should not be considered limited to that configuration. As those in the art will readily appreciate, multiple variations, with various advantages and attributes of each, are possible.

The Base Unit and the Hand Unit

Figure 2:
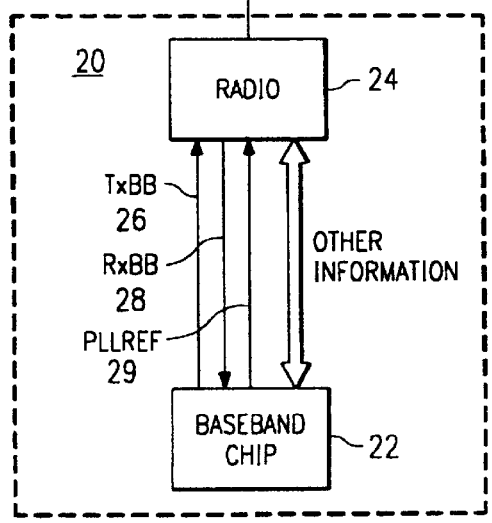
FIG. 2 is a schematic illustration of certain elements within the base unit and the hand unit of FIG. 1, which elements are employed in both the hand unit and the base unit.

Now referring to FIG. 2, a cordless telecommunications unit 20, which may be either the base unit 12 or the hand unit 13, includes two main parts. The two parts are a baseband chip 22 and a radio 24. The baseband chip 22 may include a variety of devices, such as various controllers, codecs, formatters, and other functions. The baseband chip 22 may be a single semiconductor chip, some other integrated circuit, or other circuitry. The radio 24 may also include various functionalities, such as, for example, various oscillators, up and down converters, synthesizers, and antennas. As with the baseband chip 22, the radio 24 may be a semiconductor device, another integrated circuit, or other circuitry. The preferred embodiment of the unit 20 is a baseband chip 22 which operates at CMOS-levels and transmits and receives various signals to and from the radio 24 at those levels. The radio 24 converts RF signals to and from the CMOS-level baseband signals of the baseband chip 22 to enable RF communications among the corresponding hand units and base units 12, 13.

The communications between the baseband chip 22 and the radio 24 are shown as traveling on transmission bus 26, for baseband transmit signals, and receive bus 28, for baseband receive signals. The reference clock output pin 29 carries a synthesizer reference clock derived from a crystal (not shown) for use by the radio 24 in modulating the carrier. The transmit baseband signal and the receive baseband signal are modulated over a desired carrier channel at the radio 24 and transmitted and received over RF through the RF link 17. Either the unit 20 or unit 20' is connected with a telecommunications system 11, as previously described in reference to FIG. 1.

Although not detailed herein because not necessary to an understanding of the preferred embodiment of the present invention and, in any event, generally known to those skilled in the art, the cordless telecommunications unit 20 may be equipped with various peripherals (not shown) in order to allow appropriate usability and desired operations. The peripherals may include, for example, matters such as power, power controls, keypads, touch keys, on/off controls, speakers, LCDs, transducers, such as microphones and ear pieces, and other peripheral elements. In order to function as a digital cordless telephone, the telecommunications unit 20 must be equipped with a variety of those peripherals and others.

Figure 3:
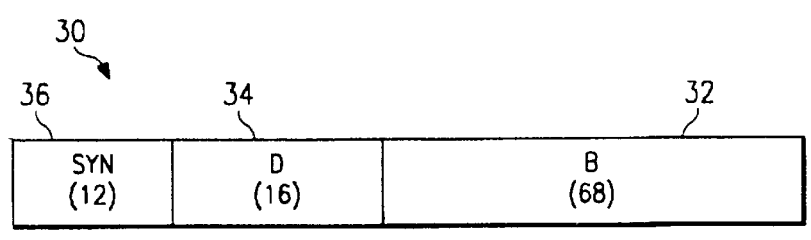
FIG. 3 is a multi-channel frame format which serves for desired transmissions and receptions of communicated information via the base unit or the hand unit of the present invention.

Referring now to FIG. 3, in the preferred embodiment of the present invention, communications between the baseband chip 22 and the radio 24, and also between cordless telecommunications unit 20 and its complementary cordless telecommunications unit 20', occur over three logical channels in a format 30. Those channels are: a transparent voice B-channel 32; an error-control, packetized control D-channel 34; and a framing synchronization SYN-channel 36. This three channel format is followed in communications between the baseband chip 22 and the radio 24 and in communications between units 20, 20'. Of course, the particular three channel format of the preferred embodiment is intended only as an example format with which the units 20, 20' can communicate. The baseband chip 22 of each of the units 20, 20' is suitable for operation using a variety of channel formats, as those skilled in the art will know and appreciate.

The Baseband Chip

Figure 4:
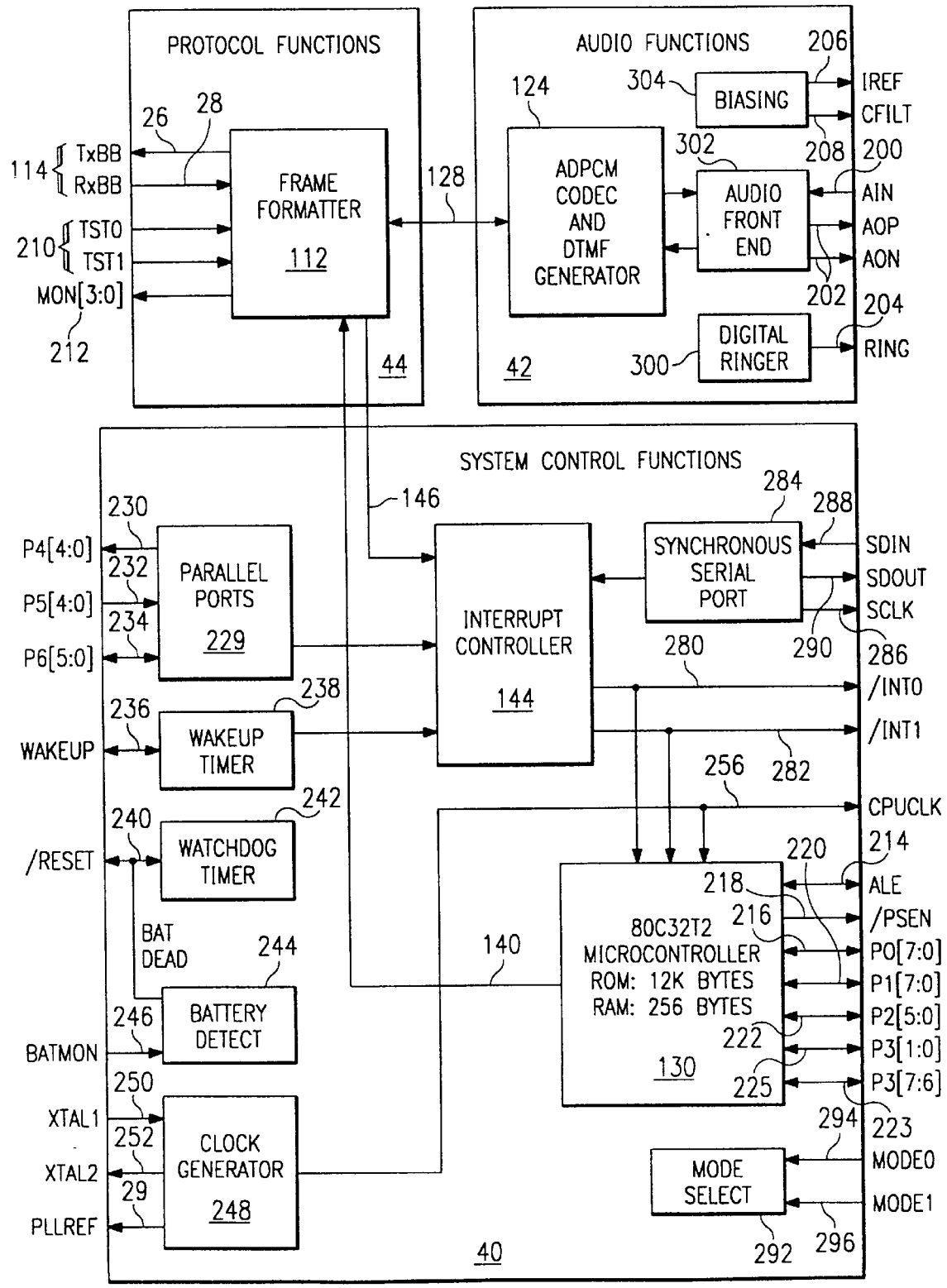
FIG. 4 is a block diagram of circuits of a baseband chip which is employed in the base unit and the hand unit.

Referring now to FIG. 4, a block diagram of the preferred embodiment of the baseband chip 22 is shown. As shown in the figure, the baseband chip 22 includes three basic circuits. Those circuits are a system control functions circuit 40, an audio functions circuit 42, and a protocol functions circuit 44. Within each of those circuits 40, 42, 44 are contained various elements, which will later be described in greater detail. Generally, the system control functions circuit 40 controls all operations of the chip 22. System control is implemented by a microcontroller 130 through software and hardware. Software for the microcontroller 130 may be provided, for example, by a mask-programmable read only memory (ROM) or some other source. The audio functions circuit 42 enables input and output of analog audio signals, such as a user's voice, rings, and dual tone multifrequency (DTMF) signal tones. The protocol functions circuit 44 enables the particular communications between the base unit 12 and the hand unit 13 (shown in FIG. 1) according to a particular protocol or format, as previously mentioned, that enables quality and accurate signal communications between those units 12, 13.

The External Interfaces

In order to better understand the circuits 40, 42, and 44, and elements and components of those circuits, it is helpful to know the external interfaces of the baseband chip 22. Beginning with the audio functions circuit 42, the external interfaces of the baseband chip 22 at that circuit 42 include two audio input and output interfaces. The first is an audio in (AIN) 200 interface for delivery of voice (or other analog audio) signals to the unit 20, 20' (FIG. 2). The other interface consists of two pins, an audio output (AOP) pin 202 and an audio output (AON) pin 202, which together form a differential audio output pair from the audio front end 302 of the chip 22. The audio front end 302 is connected internally to an adaptive differential pulse code modulator (ADPCM) codec 124. The ADPCM codec 124 may also include DTMF generation functions. The audio functions circuit 42 interfaces externally with a ringer through a RING interface 204 of a digital ringer 300. The digital ringer 300 may, for example, be a digitally programmable ring-tone generating circuit that alerts of incoming calls. Additionally, the audio function circuit 42 includes certain biasing signal interface, such as a reference current output (IREF) signal 206 and a $V_{CC}$ DC bias filter (CFILT) pin 208, that connect with a biasing component 304 of the chip 22. The biasing component 304 produces bias voltage on the pin 208 and a reference current signal 206.

As for the protocol functions circuit 44, the circuit 44 includes several external interfaces. Those external interfaces include a baseband transmit signal (TXBB) and a receive baseband signal (RXBB). The TXBB signal and the RXBB signal are each digital signals, transmitted to and received from, respectively, a radio 24 (shown in FIG. 2). The protocol functions circuit 44 may also include external interfaces for testing and development (TST0 and TST1) 210 purposes. Those TST0 and TST1 pins 210 allow the user to drive the combination of the pins 210 to one of four binary codes. Based on each particular code of the TST0 and TST1 pins 210 a certain bank of diagnostic outputs appear on a MON [3:0] bus 212. The chips 22 may, thereby, be tested via these pins 210 and bus 212 for quality assurance purposes.

Now considering the external interfaces of the system control functions circuit 40, the circuit 40 includes a number of external connections. The microcontroller 130 externally interfaces through an address-latch-enable (ALE) pin 214. The ALE pin 214 is a timing strobe that demultiplexes a Port 0 (P0[7:0]) bus 216. The ALE signal 214 serves to latch a lower order address on the Port 0 bus 216 during external accesses by the microcontroller 130. Another external interface of the microcontroller 130 is the program store enable (/PSEN) strobe 218. The /PSEN strobe 218 is an active low read strobe to external program memory (not shown), allowing fetch from that external memory device. The Port 1 (P1[7:0]) 220 bus is an 8-bit input/output (I/O) general purpose port with internal pull-ups. The Port 1 bus may be used, for example, for control and for status of various externally attached devices. A Port 2 (P2[5:0]) bus 222 serves as an address output bus, particularly, as an upper order address byte during fetches from program memory and during access to certain external data memory. A Port 3[1:0] (P3[1:0]) bus 224 serves as I/O ports. Port 3 [1:0] 224 is an asynchronous serial port, as well as a general purpose port. Using Port 3 [1:0] 224, two signals may be ported and used for either testing the baseband chip 22 or the end product telephone communications unit 20, 20', either the hand unit or the base unit, as the case may be (FIG. 2), or, for communicating other information while the hand unit 20 or 20', as the case may be, is sitting in a telephone cradle (not shown). Such a port as Port 3 [1:0] 224 may be useful, for example, for passing security codes so that periodically one unit 20 or 20' may generate a random new security code, pass it to the other unit 20' or 20, and so secure communications. The ports of Port 3 [1:0] 224 have internal pull-ups. The other external interface of the microcontroller 130 is a Port 3 [7:6] (P3[7:6]) 225 which serves as an active low external data memory write strobe and as an active low external data memory read strobe.

The system control functions circuit 40 also externally interfaces through other connections not directly associated with the microcontroller 130. These interfaces include certain parallel ports 229. Of these parallel ports 229, port 4 (P4[4:0]) 230 is a weak pull-up strong pull-down output port which drives a value that is programmed in a port-4 register 320 (see FIG. 5), and retains that value when the chip 22 goes into shutdown mode. Another one of those ports 229, is port-5 (P5[4:0]) 232 which is an input port with internal weak pull-up which can be read in a port-5 register 323 (see FIG. 5). Any change in the port-5 232 value generates a keyscan interrupt. Both port-4 230 and port-5 232 serve as a keyscan interface. The keypad, typically a network of switches, one of which is closed by a key depression, is connected to port-4 230 and port-5 232, such that the keypad column nodes are connected to port-4 230, and the keypad row nodes are connected to port-5 232. In effect, when a typical keypad key depression is made, the Port-4 pin 230 is shorted to the Port-5 pin 232, bringing the Port-5 pin 232 to the level of the port-4 pin to which it has been temporarily connected by the key depression. That causes an interrupt that propagates through an interrupt controller 144 and on to the microcontroller 130. The microcontroller 130 then operates on the Port-4 pin 230 in a sequence of steps to determine the responsible source for the interrupt. The final port of the parallel ports 229 is Port 6 (P6[5:0]) 234. Each bit in Port 6 234 is individually configurable as an input, with or without a pull-up, or as an output as a Port 6 register (not shown). Port 6 234 is a radio 24 (shown in FIG. 2) control port. The microcontroller 130, through Port 6 234, controls certain functions of the radio 24, for example, power on/off and others.

Figure 5:
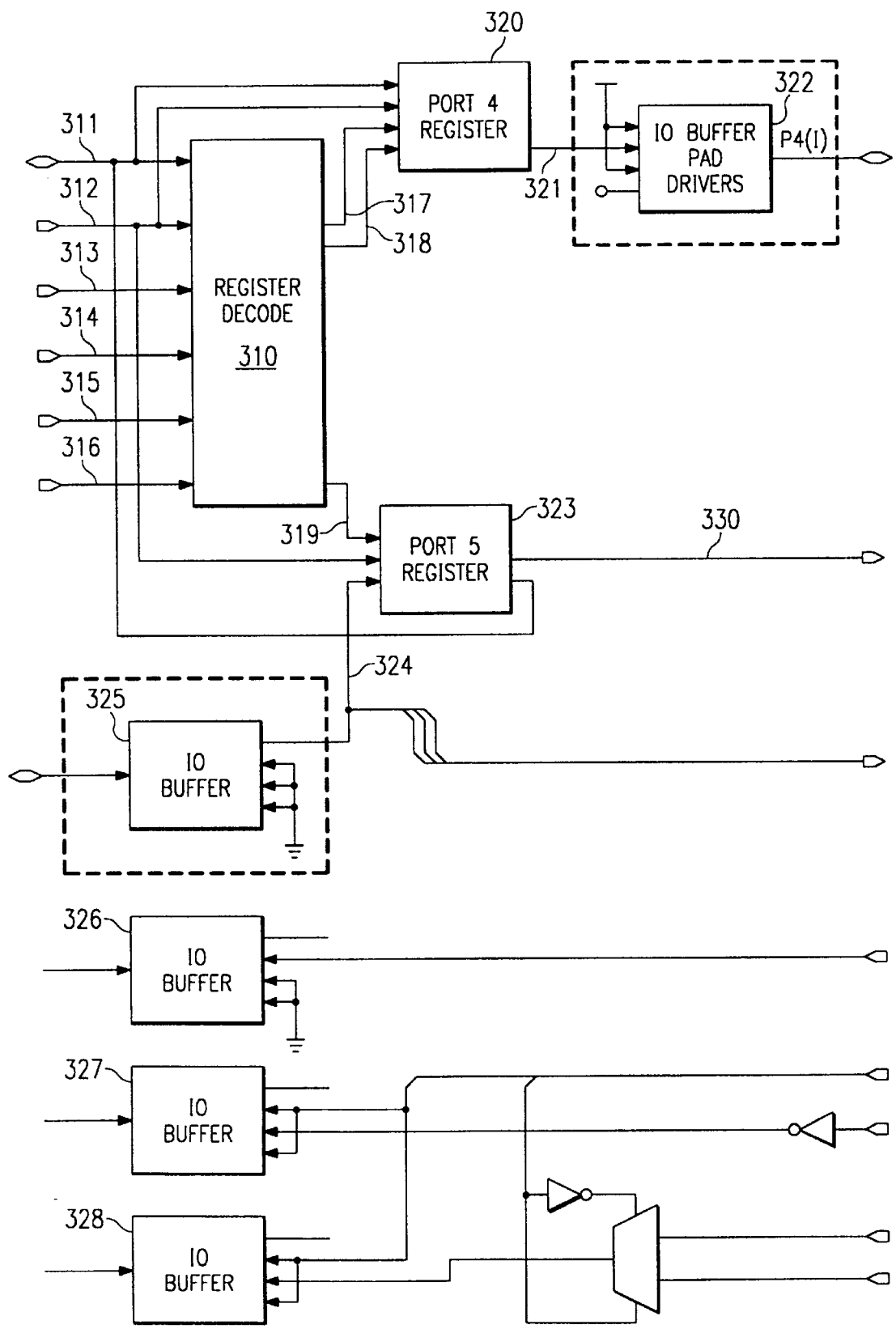
FIG. 5 is a schematic block diagram of parallel ports 230 and 232 of FIG. 4.

FIG. 5 is a schematic block diagram of ports 230 and 232. Referring to FIG. 5 of the drawings, a register decode 310 is a decode for the registers. One input is a bus called OCPBUS 311 that is internal to the chip. On the OCPBUS 311 the data and address for the registers are transferred. Another input to the register decode 310 is a chip reset line 312, which is the internal reset for the chip. Other inputs to the register decode 310 are an address latch strobe 313, a read register strobe 314, a write register strobe 315, and a block select 316. The block select 316, which is generated in another block, is a decode of the four upper bits of OCPBUS 311. The outputs of the register decode 310 are a write-port-4 line 317, a read-port-4 line 318, and a read-port-5 line 319, which are decodes from instructions that come from the microcontroller, whether you are reading or writing register port-4 or reading port-5 232.

A port-4 register 320 is a five bit register that programs the desired value to drive the port-4 230 pins. The inputs of the port-4 register 320 include the OCPBUS 311, bits four through zero, which are the data bits that are being written to the port-4 register 320. The inputs also include the chip reset line 312, the write-port-4 317 line, and the read-port-4 318 line.

The output bus of the port-4 register 320 is port-4-out bus 321, which goes to the drivers for the pins. If the signal on the port-4-out bus 321 is high, it will drive the port-4 230 pins high. If it is low, it will drive the port-4 230 pins low. The port-4-out bus 321 is an input into five pad drivers, represented by the block IO buffer pad drivers 322.

A port-5 register 323 is a read only register. The inputs include the read-port-5 line 319, the chip reset line 312, and a P5IN bus 324. The signal on the P5IN bus 324 is five bits, and is the representative value of what is at the five Port-5 232 pins.

The P5IN bus 324 is the output bus from an IO buffer block 325, which represents two buffers, for two of the Port-5 232 pins. The IO buffers 326, 327, and 328 exist for the remaining three Port-5 232 pins. The IO buffers 325, 326, 327, and 328 contain the input logic for the pad, that is, the pad drivers for the P5 pins. The outputs of the blocks 325, 326, 327, and 328 are the P5IN lines 324, which drive the value of the Port-5 232 pins when the port-5 register 323 is read.

The output of the port-5 register 323 is the OCPBUS 311. When the register 323 is read, the register 323 drives the data on the OCPBUS 311. Another output of the P5 register 323 is P5INT 330, which goes active on any change of the value of the pins of port-5 232.

Figure 6:
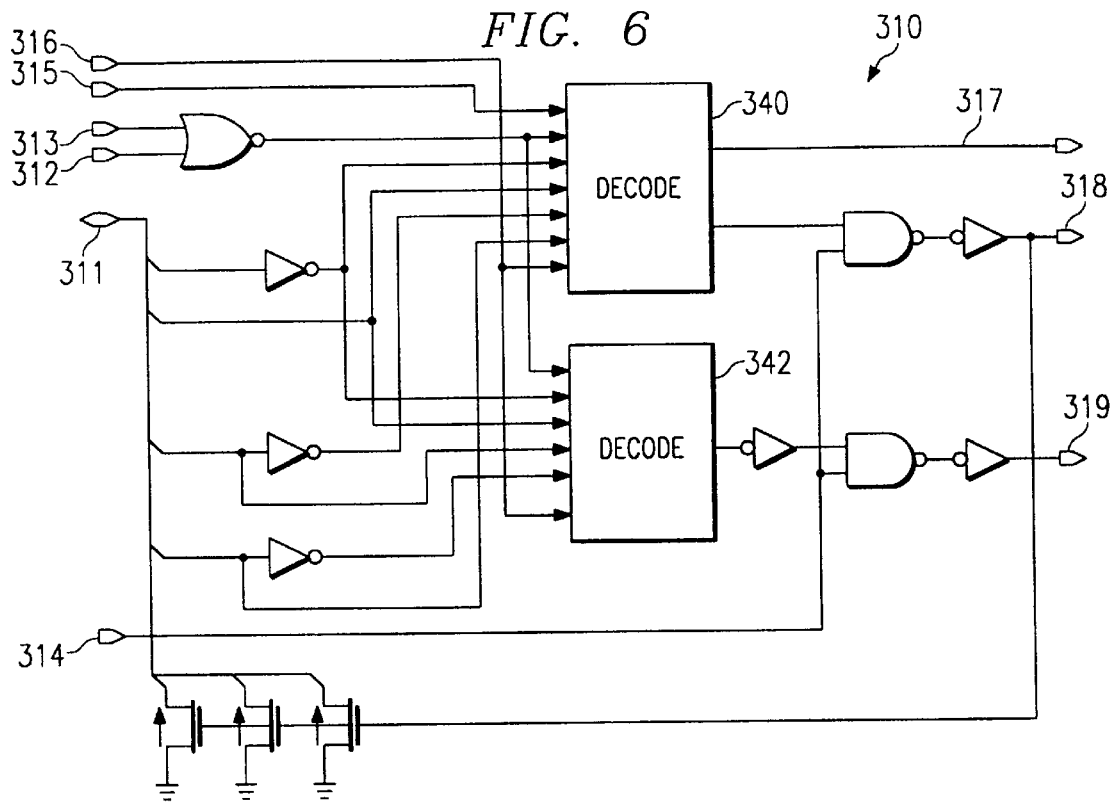
FIG. 6 is a schematic block diagram of the register address decodes for ports 230 and 232.

Referring to FIG. 6 of the drawings, the register decode 310 comprises two blocks 340 and 342, which are a decode logic. The blocks 340 and 342 take the address latch strobe 313, whether the system is reading or writing the register, and decode the bottom four bits of the OCPBUS 311, thus generating the signals on the lines write-port-4 317, read-port-4 318, and read-port-5 319, so that the system can read or write to port-4 and port-5.

Figure 7:
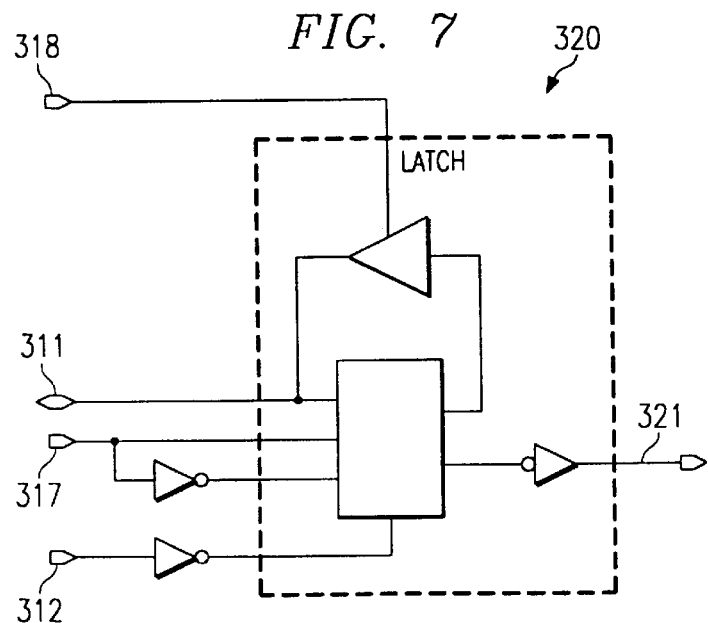
FIG. 7 is a schematic block diagram of the register for port 230.

Referring to FIG. 7 of the drawings, the port-4 register 320 is shown. The drawing actually represents five latches, which allow port-4 to handle five bits. The system programs each of those five bits to be either high or low, and such value is driven out to the P4 pin on the port-4-out bus 321.

Figure 8:
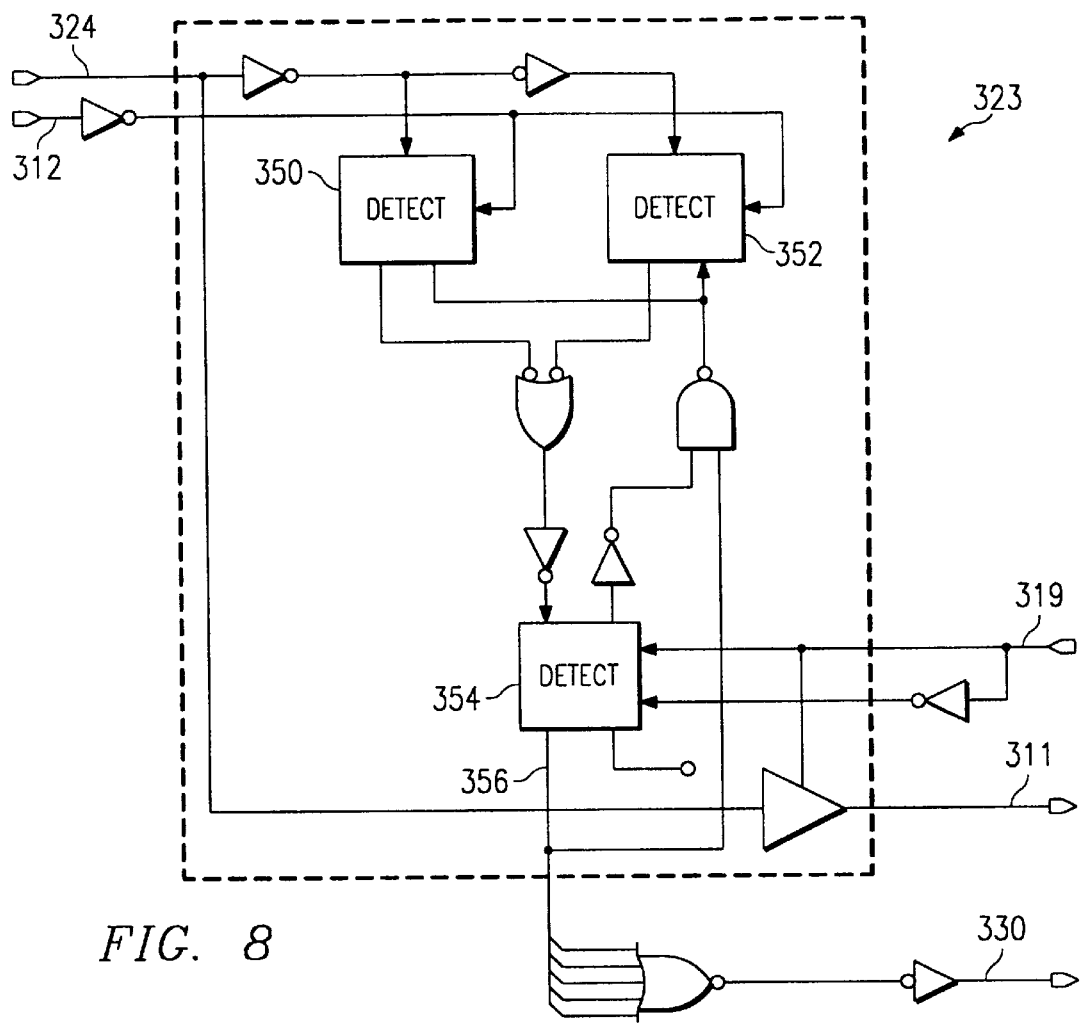
FIG. 8 is a schematic block diagram of the register for port 232.

Referring to FIG. 8 of the drawings, the port-5 register 323 includes transition detect logic. One input to the register 323 is the P5IN signal on the bus 324, which is the value at the P5 pin. The port-5 register 323 includes two transition detectors SBITM 350, 352 ("masters"), which detect either a low-to-high or a high-to-low transition. The SBITM transition detectors 350, 352 feed into a SBITS detector 354 ("slave"). If either of the transition detectors 350, 352 go active, such action will set the SBITS detector 354, which then will generate a signal on the P5INT line 330. When the read port-5 line 319 goes active, the system is reading the value at the pins. When the read port-5 line 319 goes active, it also keeps the value of the signal from changing at the DO pin 356. As a result of the port-5 read, the SBITM 350, 352 are reset.

Figure 9:
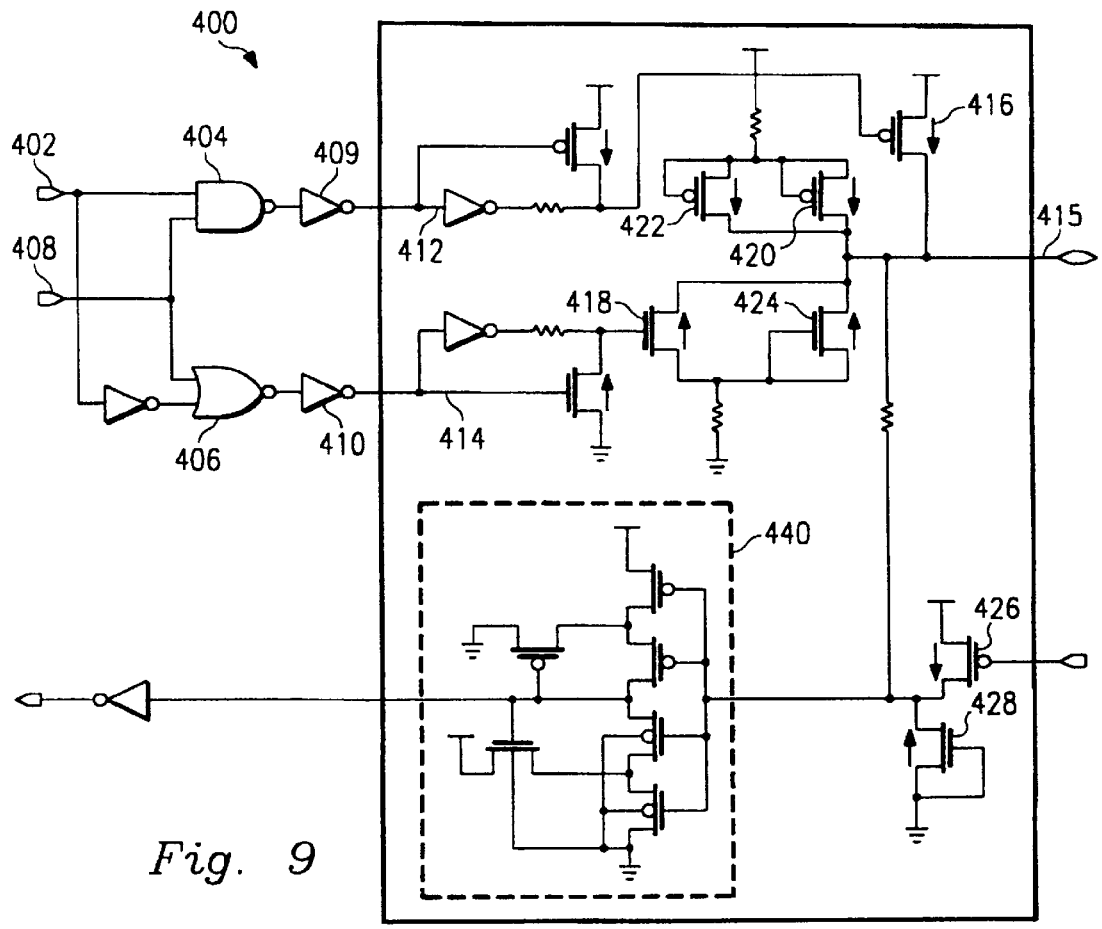
FIG. 9 is a schematic block diagram of the drivers for the input/output buffer of port 230.

Referring to FIG. 9 of the drawings, an input/output buffer 400 is depicted, which is a detailed schematic diagram of the IO buffer pad driver 322 of FIG. 5. A signal OUT 402 is an input into two gates 404, 406. If that signal is low then the input/output buffer 400 is configured to be an input; if it is high, it is configured to be an output. The value that the system drives out the pad will be the value of the signal on another input line, PORTOUT 408. The signal from the gate 404 passes through an inverter 409. The signal from the gate 406 passes through an inverter 410. The output of the inverter 409 is an IU signal on a line 412. The output of the inverter 410 is an ID signal on a line 414. The IU and ID signals drive the port IO signal, on line 415, connected to the pin 230, either high or low. When the IU and ID signals are low, they turn off the weak high driver transistor 416 and turn on the strong low driver transistor 418. The driver transistor 416 is a weak PFET. When the IU and ID signals are high, they turn off the strong low driver transistor 418 and turn on the weak high driver transistor 416. The driver transistor 418 is a strong NFET. When IU is low, and ID is high, neither driver 416 or 418 is on, and the pin is configured as an input or tri-state.

The logic of the gates and inverters 404, 406, 409, and 410 ensures that the input/output buffer 400 does not simultaneously enable p-channel and n-channel transistors. If the input/output buffer 400 were to simultaneously enable p-channel and n-channel transistors, it would expend excessive current through the driver transistors 416 and 418.

The group of transistors 440 is a Schmitt-trigger inverter. Transistors 420, 422, 424, 426, and 428 protect against electrostatic discharge.

Figure 10:
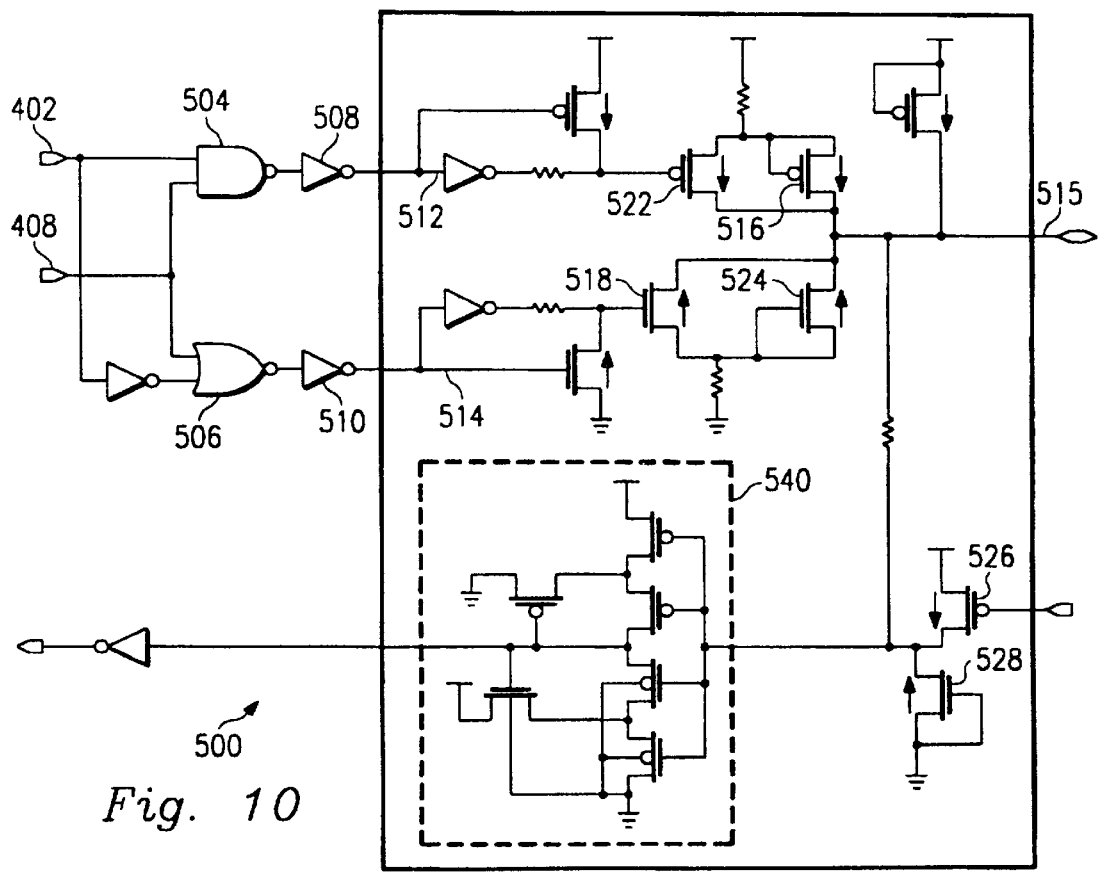
FIG. 10 is a schematic block diagram of a generic input/output port for port 232.

Referring to FIG. 10 of the drawings, an input/output buffer 500 for the port 232 is depicted. The input/output buffer 500 includes the blocks labeled IO BUFFER 325, 326, 327, and 328 in FIG. 5. A signal OUT 402 is an input into two gates 504, 506. If that signal is low then IO BUFFERs 325, 326, 327, and 328 are configured to be an input; if it is high, they are configured to be an output. The value that the system drives out the pad will be the value of the signal on another input line, PORTOUT 408. The signal from the gate 504 passes through an inverter 508. The signal from the gate 506 passes through an inverter 510. The output of the inverter 508 is an IU signal on a line 512. The output of the inverter 510 is an ID signal on a line 514. The IU and ID signals drive the port IO signal, on line 515, connected to the pin 232, either high or low. When the IU and ID signals are low, they turn off the weak high driver transistor 516 and turn on the strong low driver transistor 518. The driver transistor 516 is a strong PFET. When the IU and ID signals are high, they turn off the strong low driver transistor 518 and turn on the weak high driver transistor 516. The driver transistor 518 is a strong NFET.

The logic of the gates and inverters 504, 506, 508, and 510 ensures that the input/output buffer 500 does not simultaneously enable p-channel and n-channel transistors. If the input/output buffer 500 were to simultaneously enable p-channel and n-channel transistors, it would expend excessive current through the driver transistors 516 and 518.

The group of transistors 540 is a Schmitt-trigger inverter. Transistors 516, 524, 526, and 528 protect against electrostatic discharge.

Referring back to FIG. 4, other external interfaces of the system control functions 40 circuit include a synchronous serial port 284. This port 284 also serves to control part of the radio 24 (shown in FIG. 2). In general, channel selection in digital cordless telephones is made by a programmable synthesizer (not shown) of the radio 24. The synchronous serial port 284 is the interface over which that programming may be accomplished. As for the specific external connections of the synchronous serial port 284, that port 284 includes a serial port clock (SCLK) output pin 286, a serial port data input (SDIN) pin 288, and a serial port data output (SDOUT) pin 290. Example uses of the synchronous serial port 284 are attachment of the baseband chip 22 with EEPROM devices for purposes of retention of identification information or attachment to a programmable synthesizer employed for radio 24 channel selection.

One other pin of the system control functions circuit 40 of the baseband chip 22, a PLL reference (PLLREF) pin 254, also is associated with the radio 24. The PLLREF pin 29 carries a clock-related signal from a clock generator 248. Through the pin 29, the clock generator 248 supplies a reference frequency to the synthesizer of the radio 24.

Other external interfaces of the system control functions circuit 40 may serve other purposes, for instance, power control. Optimizing power use by reducing consumption when the unit 20 or 20' is idle is an important objective in digital cordless telephones, because those devices are typically battery powered. Several of the external interfaces serve to keep down power consumption. One of those interfaces is with a wake-up timer 238. The wake-up timer 238 serves to periodically wake-up the unit 20 or 20' from an idle state in order to check for incoming signals. A wake-up pin 236 may be attached to a passive RC circuit (not shown in detail) which forms a multi-vibrator. The wake-up timer 238 of the chip 22 serves in that regard to discharge the capacitor of that passive RC circuit and then, the capacitor through the RC time constant charges again until it again reaches a certain level that triggers the circuit to discharge again. This cycle is repeated to form a clock. The wake-up timer 238 includes a counter chain that counts the clock cycles. Upon reaching a certain count, the wake-up timer 238 then issues an interrupt.

Figure 11:
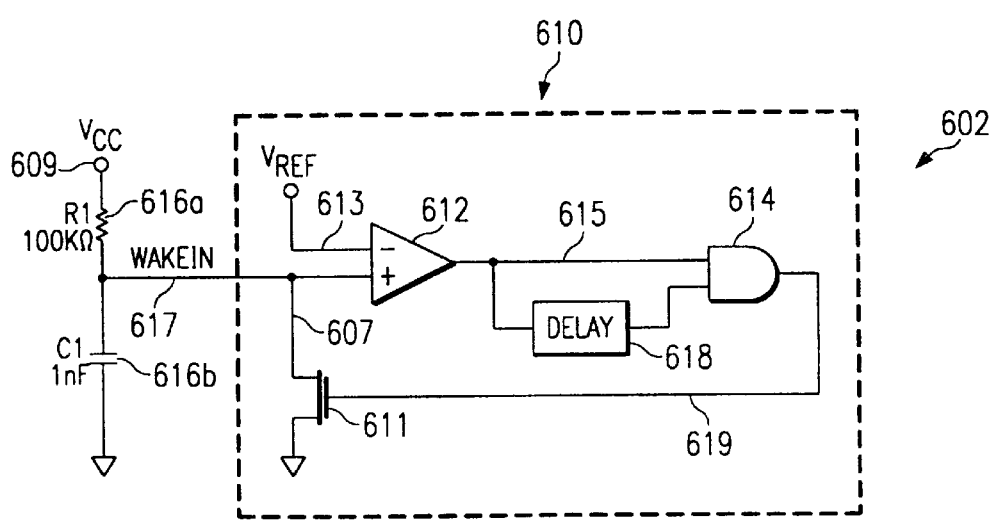
FIG. 11 is a simplified schematic diagram of a conventional wake-up timer including a conventional monostable multivibrator.
Figure 12:
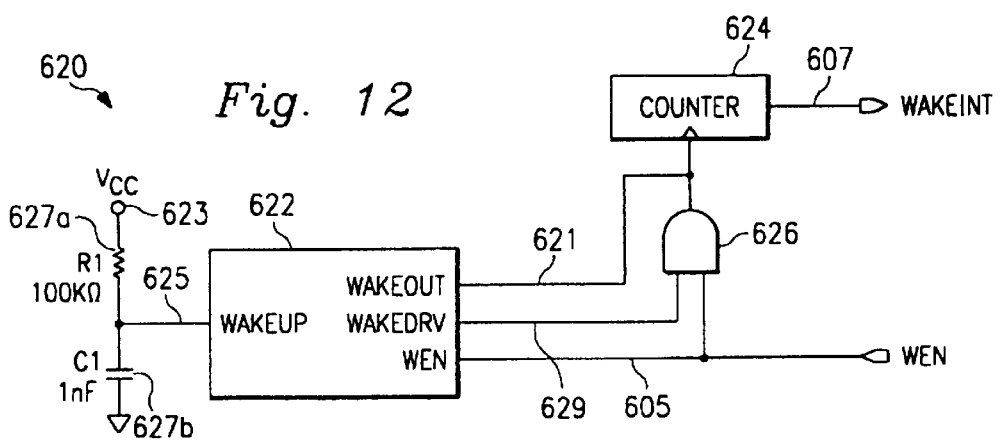
FIG. 12 is a block diagram of the preferred embodiment of a wake-up timer according to the present invention.
Figure 14:
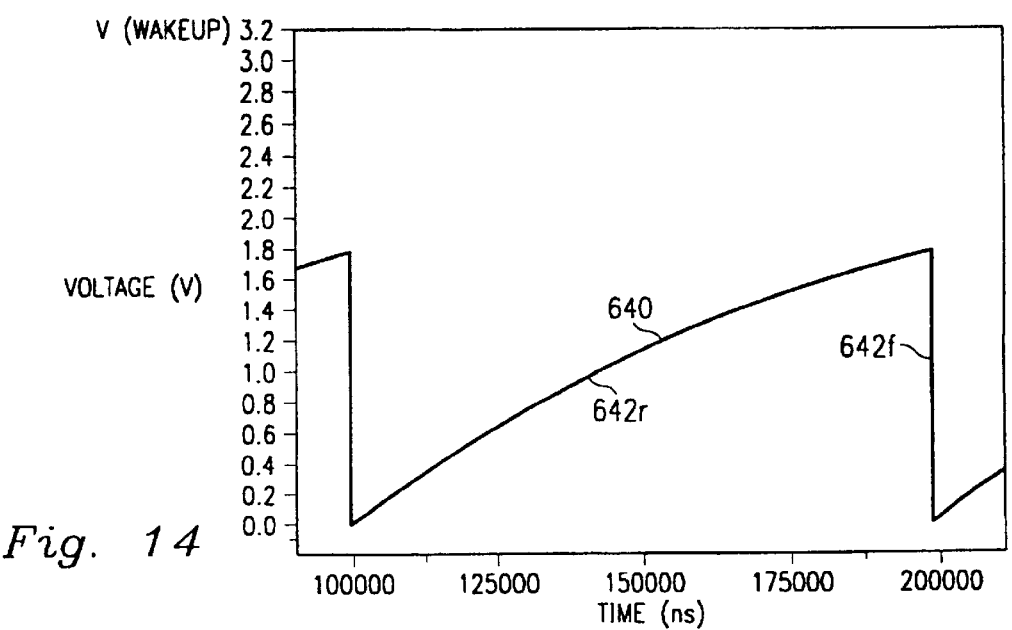
FIG. 14 is a timing diagram of the monostable multivibrator of FIG. 13.
Figure 13:
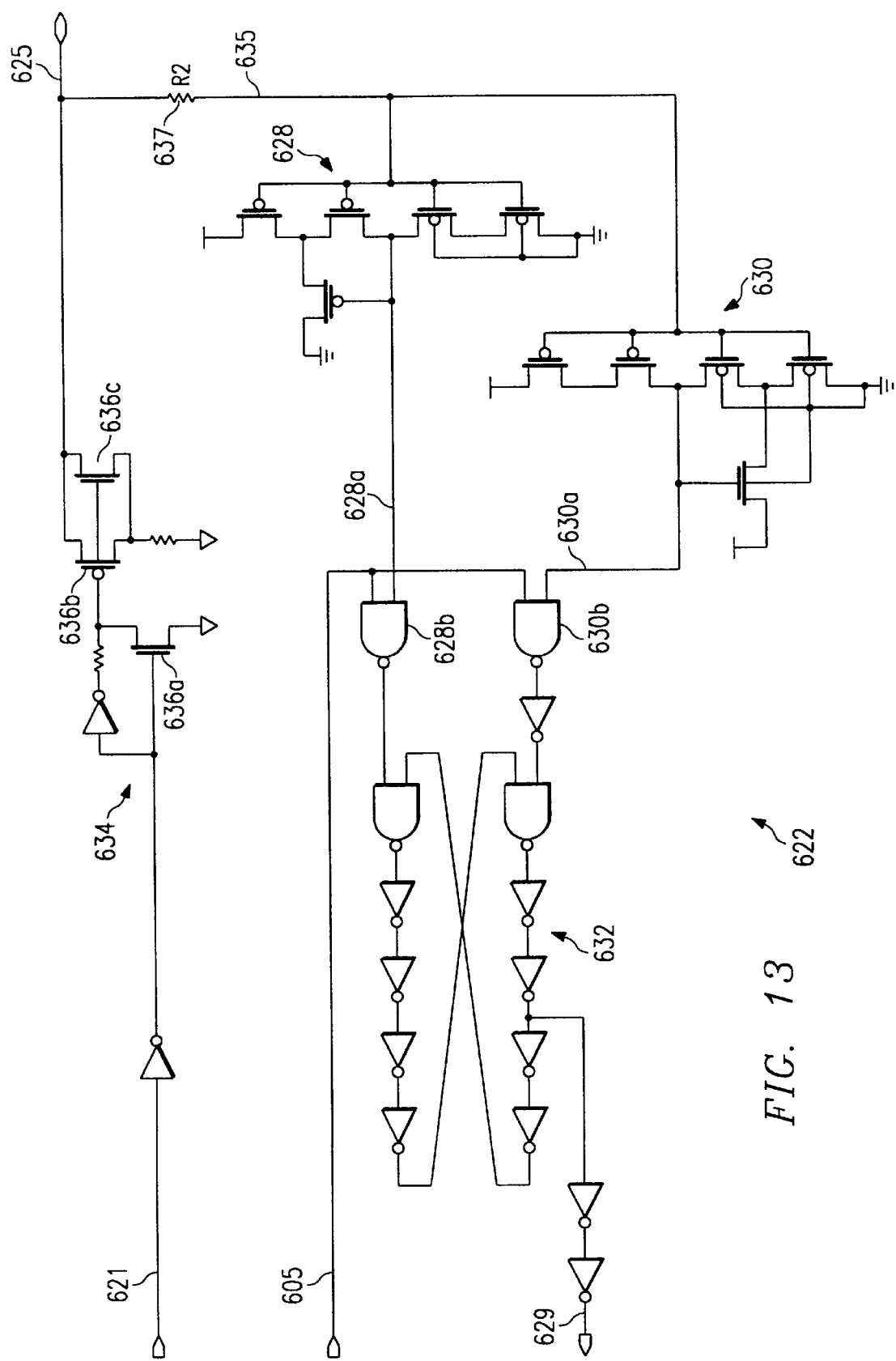
FIG. 13 is a detailed schematic diagram of the preferred embodiment of a monostable multivibrator of the wake-up timer of FIG. 12.

The prior art to the wake-up timer 238 is shown in FIG. 11, and the wake-up timer 238 itself is shown in more detail in FIGS. 12–14, as wake-up timer 620. Referring now to FIG. 11, a conventional wake-up timer 602 has a conventional monostable multivibrator (vibrator) 610. This conventional vibrator 610 is an analog device. The vibrator 610 includes, among other elements, an operational amplifier ("op amp") 612 and an AND gate 614. The vibrator 610 also includes a delay 618 and a transistor 611.

An external R-C network, including a resistor 616a and a capacitor 616b, is connected to an oscillating terminal of the op amp 612. The connecting circuitry serves as a wake-up signal 617. The resistor 616a is connected with a voltage (Vcc) 609, and the capacitor 616b is tied to ground. The resistor 616a is a 100 k ohm pull-up resistor, and the capacitor 616b is a 1 nf capacitor tied to ground, although other similar configurations and different component values are also conventional.

Connected to another terminal 613 of the op amp 612 is a reference voltage 613 ($V_{REF}$). The output of the op amp 612 is an input to the AND gate 614. The other input to the AND gate 614 is the delay 618 of the output 615 of the op amp 612.

A signal 619 is the feedback output of the AND gate 614. The feedback signal 619 connects with the base of an n-channel transistor 611. The collector 607 of the transistor 611 is connected with the oscillating terminal of the op amp 612. This provides feedback.

In operation, the reference voltage 613 is input to the op amp 612. Another voltage 609, $V_{CC}$, is input to the op amp 612 as the wake-up signal 617. When the wake-up signal 617 has higher voltage than the reference voltage 613, the output 615 of the op amp 612 goes active. Once the output 615 goes active, the n-channel transistor 611 pulls the wake-up signal 617 low. The delay 618 causes a desired time delay in the feedback output 619 from the AND gate 614.

This conventional analog vibrator 610 of the wake-up timer 602 can reduce power consumption of a device by allowing for a standby mode with wake-up. The vibrator 610 itself, however, consumes significant power, the conservation of which is beneficial. Also, the vibrator 610 can present other problems when employed in conventional wake-up timers, such as location of digital and analog circuitry and limited flexibility in application with varied R-C networks, as discussed above. The present invention overcomes these problems and others.

Referring now to FIG. 12, the preferred embodiment of a wake-up timer 620 of the present invention is illustrated. The wake-up timer 620 generally includes an inverter circuit block 622, a counter 624, an AND gate 626, and an external R-C network, including a resistor 627a and a capacitor 627b. The counter 624 and AND gate 626 may be any of various conventional or hereafter developed circuits or devices that may serve to accomplish the functions of counting and ANDing, respectively. Likewise, the R-C network 627a,b may be any resistor and capacitor arrangements and values, or any other circuits, devices, or combinations that function to provide a time constant. A voltage ($V_{CC}$) 623 is applied to the resistor 627a, and the capacitor 627b is tied to ground.

The block 622 may include several interfaces, such as, for example, a WAKEUP signal 625 connecting the block 622 with the R-C network 627a,b; an input WEN signal 605 from a source (not shown) external to the timer 620, the signal 605 being input to the block 622 and the AND gate 626; and a WAKEOUT signal 621 output from the block 622, and connecting with the output of the AND gate 626. The outputs of the AND gate 626 and the WAKEOUT signal 621 are both connected to the counter 624. The counter 624 provides a WAKEINT signal 607 which passes externally from the timer 620 for use by external circuitry (not shown).

The WEN signal 605 is an enable signal to enable/disable the wake-up timer 620. The output WAKEDRV signal 629 and the WEN signal 605 are each employed to clock the counter 624 and drive the WAKEOUT signal 621 input to the counter 624. The counter 624 serves to count oscillations of the signal, for example, to 8191. After reaching a desired count, the counter 624 then asserts the WAKEINT signal 607.

Referring now to FIG. 13, a more detailed illustration of an embodiment of the inverter circuit block 622 is shown. The block 622 includes first and second Schmitt-like trigger inverters 628 and 630, respectively. Each Schmitt-like trigger inverter 628, 630 is a solid state element that produces an inverted output when the input exceeds a specified turn-on level, and whose output continues until the input falls below a specified turn-off level. In addition to the Schmitt-like trigger inverters 628, 630, the block 622 may include, for example, a flip-flop 632 and a pad driver 634. It is of note that, although certain components of the block 622, the flip-flop 632, and the pad driver 634 may be analog in nature, the components are not combined in circuits that require any separate, analog power supply. Instead, all of the components and circuits of the block 622 are operated digitally in nature, and the block 622 utilizes only a single, digital power supply.

The Schmitt-like trigger inverters 628, 630 each have a common input of a WAKEIN signal 635. The WAKEIN signal 635 connects with the WAKEUP signal 625 through a resistor 637. The Schmitt-like trigger inverter 628 may have a turn-on level of a lower voltage in relation to the Schmitt-like trigger inverter 630, and the Schmitt-like trigger inverter 630 may have a turn-on level of a higher voltage. By employing the dual Schmitt-like trigger inverters 628, 630 having these characteristics, voltage level detection capability of the block 622 can be very fast and sufficiently accurate. Such characteristics and capability provide flexibility of application in that they allow for choice among R-C network 627a,b variations, such as variously sized resistors 627a and capacitors 627b (FIG. 12).

In operation, the WEN signal 605, when active, enables the wake-up timer 620. The WAKEIN signal 635 connects with each of the Schmitt-like trigger inverters 628, 630, and is connected with a resistor 637 tied to the WAKEUP signal 625. The WAKEUP signal 625 may be provided, for example, at a pin of an external circuit (not shown). The WAKEUP signal 625 may serve to transition such external circuit between modes, for example, from standby mode to fully operational mode.

The Schmitt-like trigger inverters 628, 630 may be employed to detect the voltage level of the pin of the external circuit via the WAKEUP signal 625. In such employment, one of the inverters 628, 630, for example, inverter 628, operates to detect a "high" voltage WAKEUP signal 625, and the other of the inverters 630, 628, for example, inverter 630, detects a "low" voltage WAKEUP signal 625. When the "low" voltage WAKEUP signal 625 is detected, the logic of the wake-up timer 620 stops driving the WAKEUP signal 625, and the external capacitive component 627b may build up a charge.

The outputs 628a, 630a from the Schmitt-like trigger inverters 628, 630 are each input to respective AND gates 628b, 630b. The WEN signal 625 is also input to the AND gates 628b, 630b. The ANDing of the outputs 628a, 630a and the WEN signal 625 in this manner allows for low power mode when the wake-up timer 620 is disabled. In operation, the output of each AND gate 628b,630b then passes to what is in effect a latch which ensures that the "high" level detect will drive the WAKEUP signal 625 low, until the "low" level detect is triggered. At the time the "low" level detect is triggered, the WAKEUP signal 625 is no longer driven.

When the WEN signal 605 is active, the outputs 628a, 630a of the Schmitt-like trigger inverters 628, 630 drive the flip-flop 632. The flip-flop 632 serves as a delay for a desired period. Because the delay may be for a short period of time, application of the timer 620 can be widely varied over a broad range of time constant values of the R-C network 627. The flip-flop 632 then drives the output WAKEDRV signal 629. The output WAKEDRV signal 629 drives the input WAKEOUT signal 621, as discussed earlier with regards to FIG. 2. The input WAKEOUT signal 621 drives the pad driver 634, and the pad driver 634 drives the oscillating WAKEUP signal 625. The pad driver 634 includes a group of n-channel transistors 636a, 636b, 636c that are configured to pull the oscillating WAKEUP signal 625 low whenever the input WAKEOUT signal 625 is "on".

Referring to FIGS. 13 and 14, in conjunction, the trigger circuit block 622, in combination with the R-C network 627a,b, produces a sawtooth waveform 640. For convenience, the wave form 640 will be described with reference to "high" and "low" voltage levels of 1.9 V and 0 V, respectively, and the range therebetween. It is to be understood, however, that other levels and another range between levels are possible, the specific levels and range stated here being given only as an example. One period of the sawtooth waveform 640 has a first wave portion 642r that rises slowly from 0 V to 1.9 V, and a second wave portion 642f that falls quickly from 1.9 V to 0 V. The first wave portion 642r is created by the R-C network 627a,b. The slope of the wave portion 642r is determined by the natural charging response of the resistor 627a and the capacitor 627b (shown in FIG. 12), as in the conventional multivibrator 10 of FIG. 11. The second wave portion 642f is created by the discharge of the network forced by the trigger circuit block 622.

During the time of the first wave portion 642r, the WAKEIN signal 635 follows the waveform, rising towards 1.9 V. When the voltage level of the WAKEIN signal 635 exceeds 1.8 V, the inverter 630 activates, thereby flipping the flip-flop 632 and turning "on" the output WAKEDRV signal 627. As a result, the input WAKEOUT signal 627 is also turned "on," and the pad driver 634 pulls the oscillating WAKEUP signal 625 low. This occurs at approximately the time that the WAKEUP signal 625 has reached the 1.9 V level.

When the pad driver 634 begins to pull the WAKEUP signal 625 low, the second wave portion 642f begins. As the WAKEUP signal 625 is being pulled low, the WAKEIN signal 635 is also being pulled low. When the voltage level of the WAKEIN signal 635 falls below 0.4 V, the inverter 628 activates, thereby flipping the flip-flop 632 again and turning "off" the output WAKEDRV signal 629. As a result, the input WAKEOUT signal 629 is also turned "off," and the pad driver 634 stops pulling the WAKEUP signal 625 low. When this occurs, the second wave portion 642f ends, and a new period of the waveform 640 begins. In this manner, oscillation is achieved in the wake-up timer 602.

One particularly desirable application for the embodiments of the wake-up timer 620 of the present invention is a cordless telephone. Cordless telephone units, such as a telephone handset unit, are often powered by a battery when removed from the cradles of the associated base set units. It is, therefore, important in such instances to minimize power consumption in order to conserve battery power. The wake-up timer 620, when incorporated in a cordless telephone unit, allows the unit to maintain a standby mode when not in use and yet to easily "wake up" when necessary, for example, in response to incoming signals.

The wake-up timer 620 may be implemented, for example, through conventional complimentary metal oxide semiconductor (CMOS) technology. It should be understood, however, that the present invention is not limited to that implementation, and may be otherwise implemented.

Referring back to FIG. 4, other interfaces of the system control functions circuit 40 include a reset (/RESET) pin 240 that connects with the watchdog timer 242 and a reset circuit, or battery detector 244 of the chip 22, and a battery monitor (BATMON) pin 246 that also connects with the battery detector 244 of the chip 22. The battery detector 244 serves to detect the power level of a battery (not shown) supplying the unit 20 or 20', as the case may be. The battery detector 244 may control the unit 20 or 20' to prevent operations when the battery power reaches a critical, minimum level. In such an event, the /RESET pin 240 serves to send a notifying signal to the radio 24 and halts operations of the chip 22. The battery monitor (BATMON) pin 246 provides a connection to the battery, and the battery detector 244 detects the battery power through the pin 246. In addition to serving to prevent operations at low battery levels, the battery detector 244 works in a trickle charger (not shown). The hand unit 20 or 20', as the case may be, comprising the baseband chip 22 could be placed in its cradle and the battery charged by a charger. The battery detector 244 may, in that instance, serve to detect a high battery level. When a critical, maximum battery power level is so detected, then the battery detector 244 may alert the microcontroller 130 and the microcontroller 130 can operate to disable the charging circuit. Even more, the battery detector 244 may alert the microcontroller 130 when the battery power level has reached some standard low level, but not yet the critical, minimum level, and the microcontroller 130 may operate to cause a warning to the user of the low battery level. The battery detector 244 is shown in greater detail in FIGS. 15 and 16.

Figure 15:
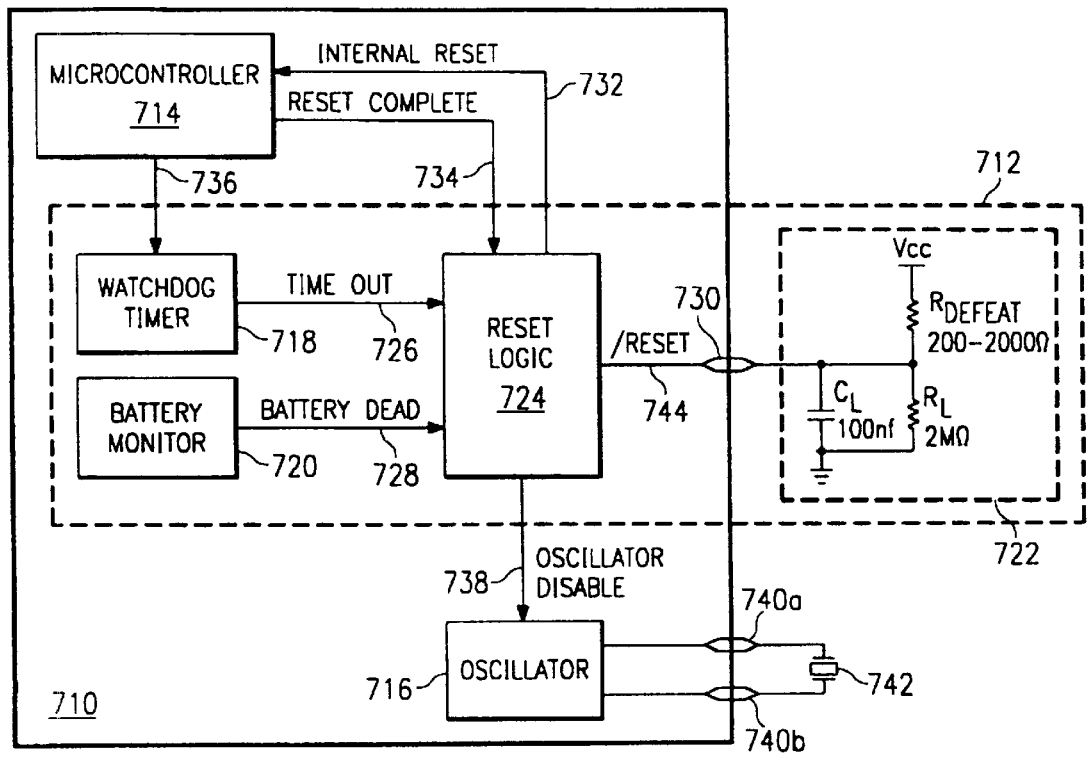
FIG. 15 is a schematic block diagram of an integrated circuit employing a reset circuit such as the battery detect 244 of FIG. 4.

Referring to FIG. 15, the reference numeral 710 refers in general to an integrated circuit employing a reset circuit 712 embodying features of the present invention. In the preferred embodiment, the integrated circuit 710 is designed in any conventional manner for use in a wireless communication device, and comprises the reset circuit 712, which is in communication with a microcontroller circuit 714 and an oscillator circuit 716, for purposes that will be described.

The reset circuit 712 includes a watchdog timer 718, a battery monitor 720, and a passive pulldown, or level adjustment, circuit 722 external to the integrated circuit 710, all connected to reset logic 724. As one skilled in the art will readily appreciate, the software being executed by the microcontroller 714 is designed to cause the microcontroller 714 to periodically refresh the watchdog timer 718 to ensure that the microcontroller 714 and software processed by the microcontroller 714 are operating properly. If the microcontroller 714 fails to refresh the watchdog timer 718 within the prescribed period, the watchdog timer 718 outputs a timeout signal 726 to the reset logic 724 indicating that the watchdog timer 718 has not been properly refreshed by the microcontroller 714.

The battery monitor 716 is designed in a conventional manner to monitor the charge level of a battery (not shown) used to supply power to the integrated circuit 710. When the battery monitor 720 detects that the charge level of the battery has fallen below a predetermined charge level, it generates a dead battery signal 728 to the reset logic 724 for purposes that will be described.

The passive pulldown circuit 722 is connected to the reset logic 724 through reset pin 730. The passive pulldown circuit 722 comprises the parallel combination of capacitor $C_L$ and resistor $R_L$ connected to ground. The passive pulldown circuit 722 may optionally contain a pullup resistor $R_{DEFEAT}$ connected between the reset pin 730 and $V_{CC}$ for purposes that will be described.

The reset circuit 712 communicates with the microcontroller 714 by an internal reset signal 732 to the microcontroller 714, and by a reset complete signal 734 to the reset logic 724. It is understood that the internal reset signal 732 and reset complete signal 734 may be connected to additional components on or off of the integrated circuit 710 to force the integrated circuit 710, or other components, into a known default state. The microcontroller 714 also communicates with the watchdog timer 718 by an 8-bit watchdog timer refresh signal 736 to the watchdog timer 718.

The reset circuit 712 additionally communicates with the oscillator 716 by an oscillator disable signal 738 generated by the reset logic 724. The oscillator 716 is similarly connected to oscillator pins 740*a* and 740*b*. A crystal 742 is connected external to the integrated circuit 710 to oscillator pins 740*a* and 740*b* to provide internal timing for the microcontroller 714.

Further, the reset circuit 712 communicates externally to the integrated circuit 710 by a bidirectional, reset signal 744 connected to reset pin 730. As in any conventional integrated circuit, the reset pin 730 protrudes from the integrated circuit 10 for connection to external components. In the embodiment shown, it is understood that the reset signal 744 is an active low signal.

Figure 16:
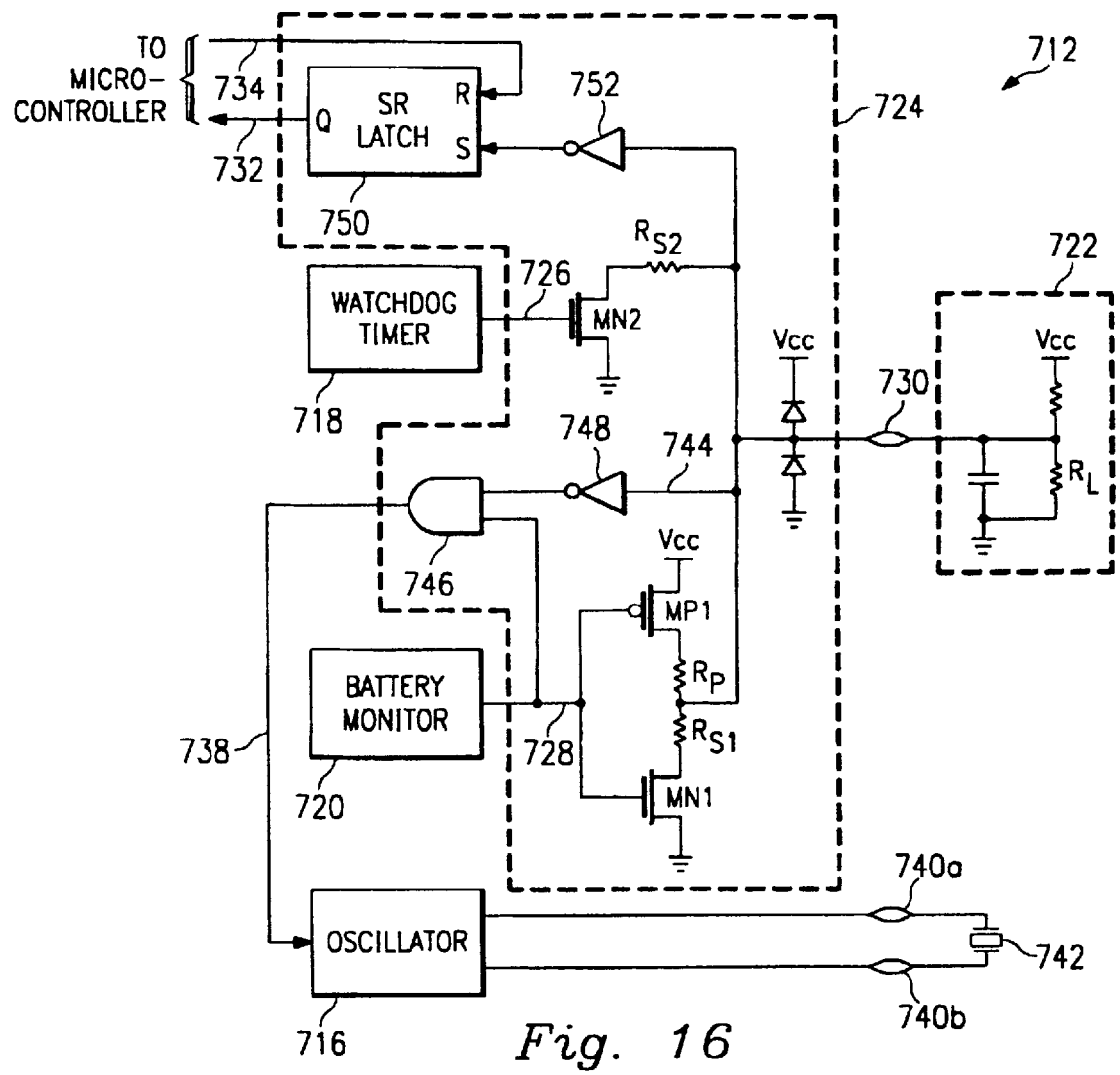
FIG. 16 is a detailed schematic block diagram of the reset circuit of FIG. 15.

FIG. 16 shows a detailed schematic of the reset circuit 712, and particularly the reset logic 724, according to the present invention. Within the reset circuit 712, the battery dead signal 728 of the battery monitor 720 is connected to the gate of p-channel field effect transistor (FET) MP1 and the gate of n-channel FET MN1. The source of FET MP1 is connected to $V_{CC}$ and the drain of FET MP1 is connected to the reset pin 730 through pull up resistor $R_P$. The source of FET MN1 is connected to the reset pin 730 through resistor $R_{S1}$ and the drain of FET MN1 is connected to ground.

The dead battery signal 728 of the battery monitor is also connected as one input to AND gate 746. The other input of AND gate 746 is connected to the inverted reset signal 744 through inverter 748. The output of the AND gate 746 is connected to the oscillator 716 and provides an oscillator disable signal 738.

The timeout signal 726 of the watchdog timer 718 is connected to the gate of n-channel FET MN2. The drain of FET MN2 is connected to the reset pin 730 through resistor $R_{S2}$ and the source of FET MN2 is connected to ground.

An SR (set, reset) latch 750 is used to provide at its Q output the internal reset signal 732 to the microcontroller 714. The set input of the SR latch 750 is the logical inversion of the reset signal 744. The reset input of the SR latch 750 receives the reset complete signal 734 generated by the microcontroller 714.

Diode D1 is connected between the reset pin 730 and $V_{CC}$, and diode D2 is connected between the reset pin 730 and ground. Diodes D1 and D2 are provided to protect against electrostatic discharge. D1 also safely discharges the load capacitance to $V_{CC}$ in the event of a sudden drop in the $V_{CC}$ level.

In operation, the charge level of the battery is ordinarily above a predetermined charge level, such that the battery monitor 720 generates a low dead battery signal 728 to the gates of FETs MN1 and MP1. With a low battery dead signal 728 present at the gate of FET MN1, FET MN1 is turned off, prohibiting any current from flowing through $R_{S1}$ to ground. However, with a low dead battery signal 728 present at the gate of FET MP1, FET MP1 is turned on such that current flows from $V_{CC}$ through both $R_P$ and the passive pull down circuit 722 to ground. With MP1 turned on, the resistor divider created by $R_P$ and $R_L$ causes a high reset signal 744, indicating that a reset is not requested.

A low dead battery signal 728 also causes the AND gate 746 to generate a low oscillator disable signal 738, which permits the various clocks and the microcontroller 714 on the integrated circuit 710 to continue operation.

With the battery in a sufficiently charged state, the microcontroller 714 is free to operate, and must refresh the watchdog timer 718 periodically to prevent the generation of the timeout signal 726. In the present invention, the microcontroller 714 must write a specific sequence of bits to the watchdog timer 718 on the line 736 to refresh the watchdog timer 718. In normal operations, the watchdog timer 718 is properly refreshed and generates a constant low time out signal 726 to the gate of FET MN2. With a low signal present at the gate of FET MN2, FET MN2 is turned off, prohibiting current from flowing through $R_{S2}$ to ground, which enables $R_P$ and $R_L$ to maintain the reset signal 744 at a high level.

If the microcontroller 714 fails to write the specified sequence to the watchdog timer 718, the watchdog timer then pulses the time out signal 726 high. When a high time out signal 726 is present at the gate of FET MN2, FET MN2 is turned on, which permits current to flow through $R_{S2}$ to ground. If the battery monitor 720 is generating a low dead battery signal 728, current will flow from $V_{CC}$ through $R_P$ and through the parallel combination of $R_{S2}$ and $R_L$. The value of $R_{S2}$ is chosen to assure that the resistor divider created by $R_P$ and the parallel combination of $R_{S2}$ and $R_L$ causes a low reset signal 744, indicating that a reset is requested. Further, the value of $C_L$ is chosen such that the time constant of the discharge of $C_L$ is smaller than the duration of the time out signal 726 to assure that the reset signal 744 will arrive at a low level before MN2 is turned off.

With the reset signal 744 low, the S input of the SR latch 750 is driven high by the inverter 752, thus causing the Q output of the SR latch 750 to go high. This signals the microcontroller 714 that a reset has been requested, and the microcontroller 714 goes through its reset sequence. By utilizing the SR latch 750, the reset logic 724 is effectively able to extend the duration of the internal reset signal 732 until the microcontroller 714 has completed its reset operations. Further, the use of SR latch 750 protects against repeated resets, or other unpredictable operations, which might be caused by a noisy reset signal 744. When the microcontroller 714 has completed its reset sequence, it pulses the reset complete signal 734 high, which drives the R input of SR latch 750 high and causes the Q output to change to a low level. If the reset signal 744 is still at a low level, the Q output will again change to a high level and the microcontroller 714 will repeat its reset sequence. Normally, however, the reset signal 744 will have changed to a high level, as a result of FET MN2 being turned off, and the microcontroller 714 will proceed with normal operations.

When the battery monitor 720 detects that the charge level of the battery has fallen below a predetermined value, the battery monitor 720 generates a high dead battery signal 28 at the gates of FETs MP1 and MN1, which turns off FET MP1 and turns on FET MN1. With MN1 turned on, the charge stored in $C_L$ is discharged through $R_L$ and $R_{S1}$ to ground, causing a low reset signal 744 which indicates that a reset is requested. In this condition, both of the inputs to AND gate 746 are high, resulting in a high oscillator disable signal 738 that causes the clocks on the integrated circuit 710 to stop functioning and effectively halts the microcontroller's 714 operations. While the presence of a low reset signal 744 will cause the Q output of the SR latch 750 to go high, because the microcontroller 714 has ceased operating, the internal reset signal 732 has no practical effect in this condition.

Because the oscillator disable signal 738 is only high when both the dead battery signal 728 and the reset signal 744 are true, the oscillator 716 is disabled only if the battery is dead, and is not affected by the watchdog timer timeout. It is understood that the oscillator 716 is disabled to conserve energy when the battery has fallen below a critical level. By disabling the oscillator 716 only in a dead battery condition, the oscillator 716 does not have to recycle and spin up for every reset.

The passive pulldown circuit 722, consisting of capacitor $C_L$ and $R_L$ is specifically designed to discharge any voltage built up on $C_L$ in the event that power is lost to the integrated circuit 710 in such a manner that none of the FETs MP1, MN1 or MN2 are operational.

Additionally, by making the reset signal 744 bidirectional, it is possible to force the integrated circuit 710 into reset by pulling the reset signal 744 low using external circuitry (not shown) attached to the reset pin 730.

$R_{DEFEAT}$ may be optionally used to assist in testing of the integrated circuit 710. With an appropriately chosen value of $R_{DEFEAT}$, the value of the reset signal 744 can be maintained at a high level regardless of whether any of the FETs MP1, MN1 or MN2 are active. For example, during testing of the integrated circuit 710, the watchdog timer 718 may not be refreshed and will attempt to cause a reset. This is undesirable because repeated resets would prevent sufficient testing of the integrated circuit 710. Further, during testing it may be desirable to allow oscillator 716 to continue operation even when the battery monitor 720 has detected a low battery level. Accordingly, by the use of $R_{DEFEAT}$ tied to $V_{CC}$, to hold the reset signal 744 high, AND gate 746 will not generate a high oscillator disable signal 738 even if the battery monitor 720 detects a low battery condition. As one skilled in the art will readily appreciate, it is possible to select a value for $R_{DEFEAT}$ which will hold the reset signal 744 high during a watchdog timer 718 time out and yet allow the reset signal 744 to drop low when a dead battery signal 728 occurs.

By causing the integrated circuit 710 to reset when the software is not operating properly, as well as when the battery has fallen below a predetermined charge level, the integrated circuit prevents the transmission of undesirable electromagnetic signals.

Further, by integrating the battery monitor 720 and the watchdog timer 718 into the integrated circuit 710 in connection with the reset logic 724, an external battery monitor 720 is not required. This reduces interconnectivity between the integrated circuit 710 and the board on which it is placed, saving overall board space and reducing the number of required external components.

Further, through the utilization of the passive pulldown circuit 736, the reset signal 744 will be brought low if none of the FETs MN1, MN2 and MP1 is functioning.

Moreover, the AND gate 746 enables the oscillator 716 to be disabled only when the battery is dead and the reset is not overridden externally.

It is understood that several variations may be made in the foregoing without departing from the scope of the invention. For example, the integrated circuit need not be specifically designed for use in wireless communications. Additionally, the AND gate 746 may have any number of additional inputs, the values for the various resistors and capacitors may differ, and different logic circuits may be utilized.

Refering back to FIG. 4, the watchdog timer 242 operates continuously to check that software of the baseband chip 22 continues to service the watchdog timer 242 within a given timeout period, according to design. The timeout period may, for example, be about 0.9 seconds or some other period. The /RESET pin 240 connected to the watchdog timer 242 may serve for application, by the watchdog timer 242, of a strong pull-up to $V_{CC}$. This facilitates software development without intervention of watchdog timer 242 induced reset. Software routines which service the watchdog timer 242 may be included or omitted from the software executed during development. This allows operation of the chip 22 without watchdog timer 242 reset occurrence, such as may be desired in software and service development.

Further, the system control functions circuit 40 includes a clock generator 248 which provides clock signals for the baseband chip 22 and for overall timing and synchronization of the entire unit 20, 20' (shown in FIG. 2). The clock generator 248 externally interfaces via a crystal input (XTAL 1) signal 250 and a crystal output (XTAL 2) signal 252. Also, as previously mentioned, the clock generator 248 externally supplies a phase lock loop, i.e., a synthesizer, of the radio 24 (shown in FIG. 2) with a clock frequency (PLLREF), derived from the crystal frequency of the clock generator 248. The clock generator 248 also supplies internally to the microcontroller 130 a clock signal (CPUCLK) 256, which CPUCLK signal 256 is also available through an external interface. The clock generator 248 is shown in greater detail in FIGS. 17-22.

Figure 17A:
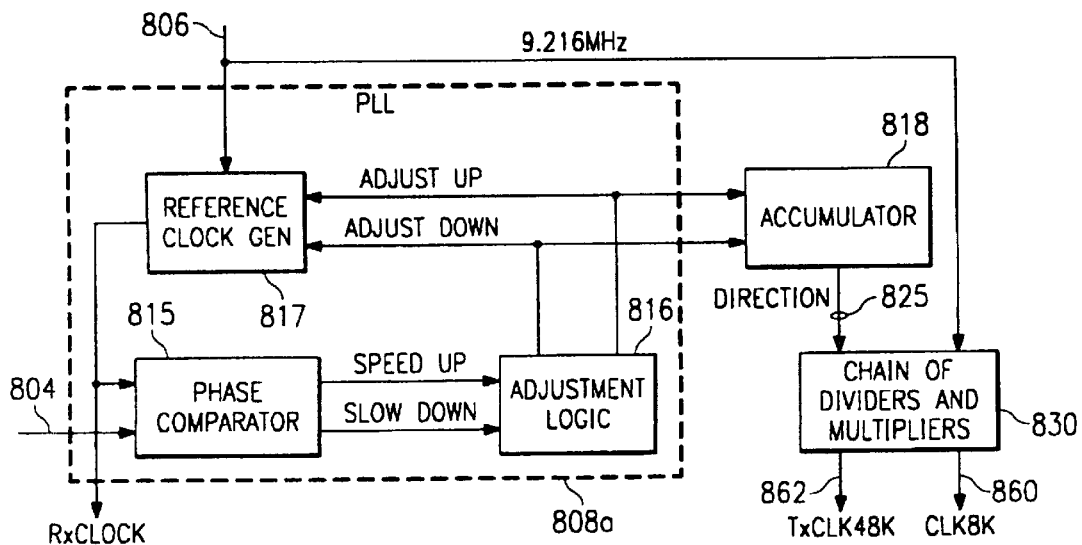
FIG. 17a is a block diagram of a circuit according to the present invention, for slaving the transmit clock and receive clock timing of a communications unit to another unit acting as master timer.
Figure 17:
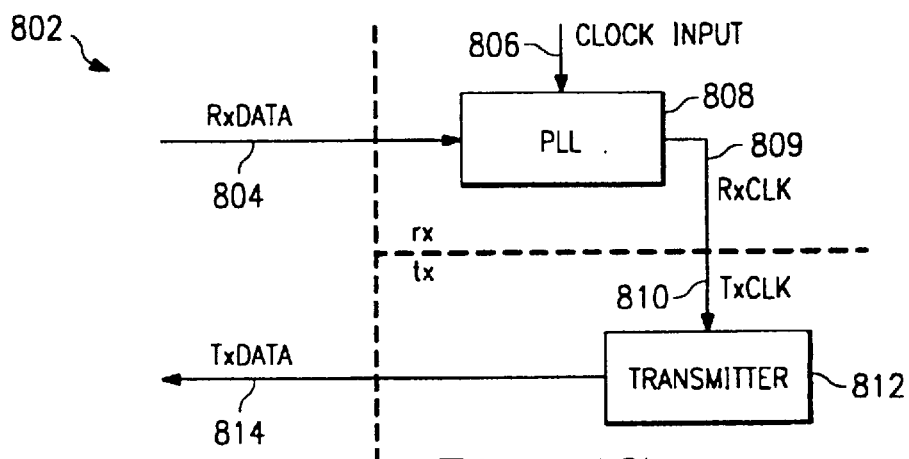
FIG. 17 is a simplified scheme and configuration previously employed in slaving the transmit clock and receive clock timing of a communications unit to another unit acting as master timer.

Referring to FIG. 17, a typical transmit clock generation scheme and unit 802 is illustrated. In the typical unit 802, a receive data signal 804 is received by the unit 802 from a remote transmitter (not shown in FIG. 17). The unit 802 is maintained as a timing slave to the remote transmitter, which is the timing master. The receive data signal 804 is picked up by a phase lock loop 808 of the unit 802. This phase lock loop 808 is controlled by a clock input signal 806. The clock input signal 806 is derived internally to the unit 802 from a crystal (not shown in FIG. 17) of the unit 802.

In prior art, a recovered clock signal RXCLOCK 809 was adjusted based on activity of the phase lock loop 808 in locking on the receive data signal 804. One conventional approach to the adjustment has been to derive within the unit 802 certain up and down signals from the phase lock loop 808 that serve to increment or decrement the phase of the recovered clock signal RXCLOCK 809. The up and down signals control a divisor value, applied between the clock input signal 806 and the recovered clock signal RXCLOCK 809, affecting a phase increment or decrement, thereby adjusting the average frequency of the recovered clock signal RXCLOCK 809.

In prior art, a transmit clock signal 810 was derived from the recovered clock signal RXCLOCK 809, typically by using the recovered clock signal RXCLOCK 809 directly. In such an application, the average frequency of the transmitted signal, dictated by the transmit clock signal 810, is thereby regulated by the phase lock loop of the receiver operating on timing information contained in the receive data signal 804.

Figure 18:
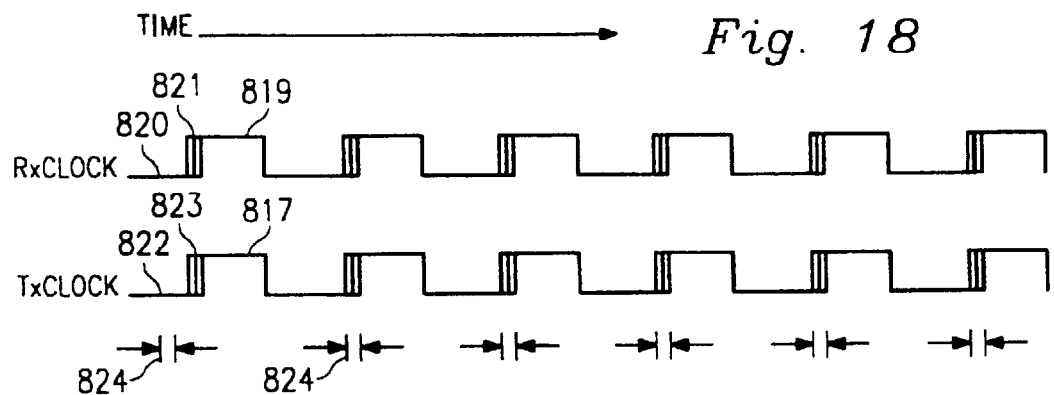
FIG. 18 is an illustration of waveforms of a receive clock signal and a transmit clock signal, each slaved to a master in accordance with the prior scheme and configuration of FIG. 17.

Now referring to FIGS. 17 and 18, in conjunction, a receive clock signal waveform 820 over time is depicted. The waveform 820 is that of the receive clock signal 809 referred to in the preceding paragraph. This receive clock signal waveform 820 is typical of that of prior units 802 operating as timing slave. It is of note that at each leading edge of a receive clock signal pulse 819 an adjustment 821 is made to compensate for jitter. This adjustment 821 is made by varying a divisor employed to obtain the receive clock signal 809 having the waveform 820.

Each adjustment 821 of the receive clock signal waveform 820 is also found as an adjustment 823 in the transmit clock signal waveform 822. The transmit clock signal waveform 822 is typical of that of prior units 802 operating as timing slave. Because the prior clock generation schemes directly control the transmit timing from the receive clock signal 809, the transmit clock signal 810 generated under those schemes was an accurate reflection of the receive clock signal 809. The adjustment for jitter was made using the phase lock loop 808 at each cycle of the transmit timing derived from the receive clock signal 809 in order to yield the transmit clock signal 810.

The adjustments 821, 823 of the receive clock signal waveform 820 and the transmit clock signal waveform 822, respectively, are seen to be over a range 824 of the signal waveforms 820, 822 over time. Because that range 824 varied at each cycle of receive clock signal and transmit timing under the prior schemes, the transmit clock signal waveform 822 of the prior methodology was jumpy and varied over each cycle. The present invention provides benefits in these respects.

Referring to FIG. 17a, the receive data signal 804 is an input to a phase lock loop 808a. More specifically, the receive data signal 804 is an input to a phase comparator 815 within the phase lock loop 808a. The recovered reference clock signal 809 is another input to the phase comparator 815. The phase comparator 815 generates two signals, "SPEED UP" and "SLOW DOWN", depending on the polarity of the phase correction that should be applied to the recovered clock signal RXCLOCK 809 to improve the alignment of the recovered clock signal 809 to timing information within the received data signal 804. The "SPEED UP" and "SLOWDOWN" signals are inputs to an adjustment logic circuitry 816. The adjustment logic circuitry 816 generates two signals, "ADJUST UP" and "ADJUST DOWN", responsive to activity on its inputs. The "ADJUST UP" and "ADJUST DOWN" signals are, in turn, inputs to a reference clock generator circuitry 817 and to an accumulator 818. The clock input signal 806 is also an input to the reference clock generator circuitry 817.

The reference clock generator 817 divides the frequency of the clock input signal 806 by a time-varying divisor, the divisor value being responsive to the "ADJUST UP" and "ADJUST DOWN" inputs. The output of the clock divider is the recovered clock signal 809. Therefor, changing the divisor effectively increments or decrements the phase of the output recovered clock signal RXCLOCK 809. The phase comparator compares the phase of the recovered clock RXCLOCK 809 to timing information extracted from the receive data signal 804, completing the feedback path in the phase lock loop. The accumulator 818 accumulates the adjustments "ADJUST UP" and "ADJUST DOWN" made by the adjustment logic 816. The accumulator generates a "DIRECTION" signal 825, which is an input to a divider chain 830, depicted in FIG. 19. The divider chain 830 applies accumulated adjustments, in the form of the "DIRECTION" signal 825, to vary the divisor value of the divider chain 820 and thereby vary the frequency of the divider outputs, TXCLK48K and CLK8K, in order to slave them to timing information in the receive data signal 804 of the remote communications unit (not shown). A key feature of the invention is that the divider output TXCLK48K is adjusted much less often than the receive recovered clock RXCLOCK 809, reducing transmitter jitter compared to the prior art.

Figure 19:
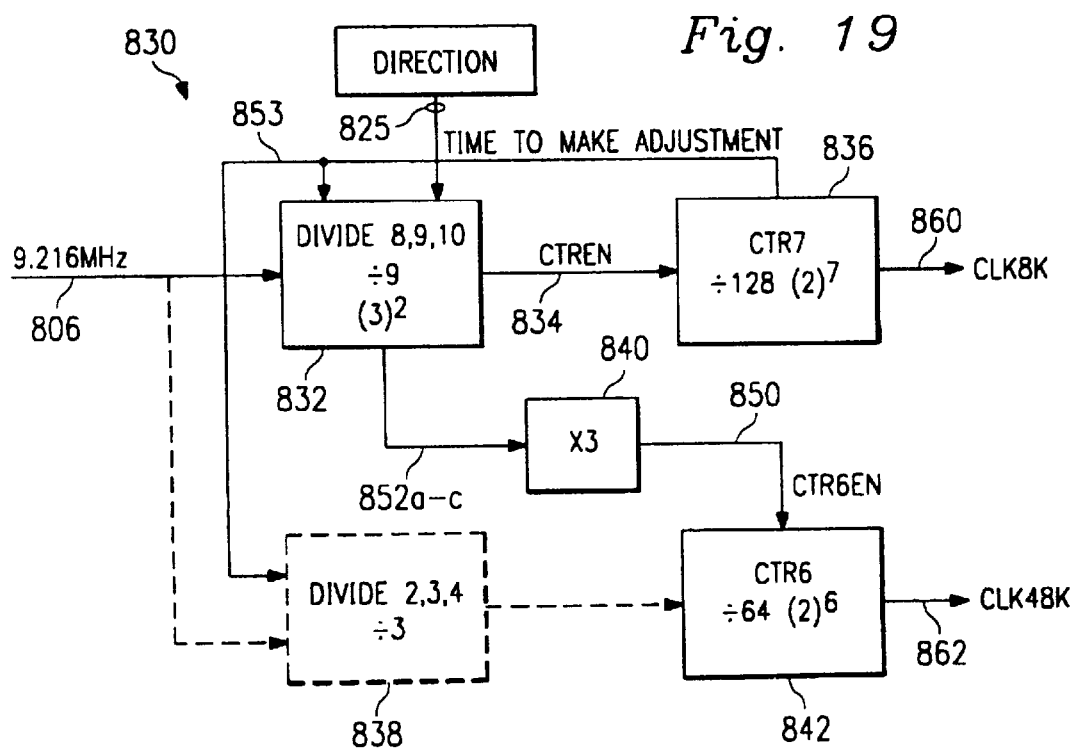
FIG. 19 is a simplified schematic of the chain 830 of dividers and multipliers of FIG. 17*a*.
Figure 20:
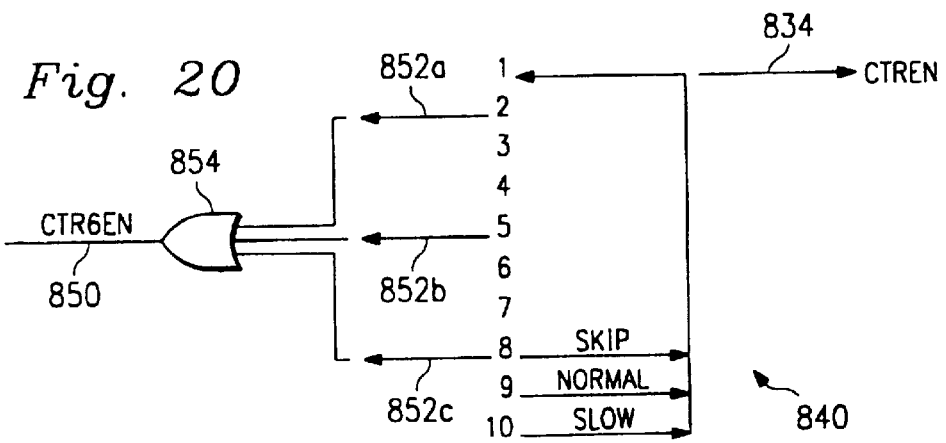
FIG. 20 is an illustration of the operation of the multiply (by 3) circuit 840 of FIG. 19.

FIGS. 19 and 20 together illustrate the chain 830 of dividers and multipliers of FIG. 17a, to obtain an internal clock signal 860 (an 8 kHz clock signal), and a transmit clock signal 862 (a 48 kHz clock signal). In the divider chain 830 of FIG. 19, a clock input signal 806 from the crystal (not shown) of the slave unit is shown as an input. The clock input signal 806 is a 9.216 MHz signal. The clock input signal 806 is, more specifically, an input to a divider (by 8, 9, 10) circuit 832. This divider (by 8, 9, 10) circuit 832 provides for division of the clock input signal 806 by various values, depending on the application. Referring to FIG. 19, the values for the divider may be 8, 9, or 10, because the nominal frequency of the clock input signal 806 is 9.216 MHz. In any event, the particular values and frequencies shown in FIG. 19 are merely examples and other values and frequencies may be employed according to the same concepts of the present invention. Also, as previously described, the particular divider value employed in the divider (by 8, 9, 10) circuit 832 at any instant may be dictated by the particular activity of the phase lock loop 808 (shown in FIG. 17), as in accordance with the prior technology.

From the divider (by 8, 9, 10) circuit 832, an adjusted signal 834 is obtained. The adjusted signal 834 is a 1.024 MHz signal when the divider value 9 is used by the divider (by 8, 9, 10) circuit 832. This adjusted signal 834 is further divided in a counter (ctr7) block 836. In the example of FIG. 19, the counter (ctr7) block 836 operates to divide the adjusted signal 834 by the value 128, yielding a desired clock signal 860 of 8 kHz for use by the unit. The 8 kHz clock signal 860 is slaved to the timing of a master unit communicating with the slave unit 802 containing the divider chain 830.

Referring now to FIG. 19, the preferred embodiment of the present invention provides for derivation of the transmit clock signal 862 from the adjusted signal 834, rather than from the receive clock signal 809 (shown in FIG. 17) as had been previously done. The divide (by 3) block 838 shown in phantom in FIG. 19 is a conceptual illustration, showing what the divider (by 8, 9, 10) circuit 832 and a multiply (by 3) circuit 840 accomplish.

In order to accomplish the derivation of the transmit clock signal 862 from the adjusted signal 834, rather than from the receive clock signal 809 (FIG. 17), the signal 834 is adjusted, and is multiplied via the multiply (by 3) circuit 840 to achieve the correct resulting nominal frequency of the transmit clock signal 862. The clock input signal 806 goes to the divider (by 8, 9, 10) circuit 832, where it is divided by 9. Signals 852a–c are output from the divider (by 8, 9, 10) circuit 832, and pass to the multiply (by 3) circuit 840. A resulting signal 850 going to the counter (ctr6) block 842 has a net factor of (⅑)×3=⅓ applied to it. The divide (by 3) block 838 in phantom illustrates that the input to the counter (ctr6) block 842 has a rate that is ⅓ of the rate of the input clock 806, i.e., 9.216 MHz/3 in the example. The present invention, however, takes the adjusted signal 834, and so there is not any need of performing any adjustment with respect to the transmit timing in order to obtain the desired transmit clock signal 862.

The prior schemes, on the other hand, necessarily adjusted both the receive clock signal 809 (shown in FIG. 17), and the transmit timing derived therefrom by employing the phase lock loop 808 (shown in FIG. 17) to compensate for jitter of each of the bits of the receive data signal 804 and the transmit timing derived therefrom. Employing the scheme of the embodiment of the present invention, that is, accumulating all adjustments needed to make the receive clock signal 809 track the receive data signal 804, applying those adjustments in a small magnitude at a much slower rate to yield the adjusted signal 834, and then deriving the transmit clock signal 862 from the adjusted signal 834, provides advantages of requiring less adjustment, as well as possibly limiting jumpiness of the resulting transmit clock signal 862. If the particular transmit clock signal 862 obtained by the present scheme is a 48 kHz signal, as in FIG. 19, a signal from the multiply (by 3) circuit 840 is passed to a counter (ctr6) block 842 for division by the value 64. That division yields the transmit clock signal 862 as a 48 kHz signal.

In summary, FIG. 19 illustrates a divider chain circuit which has a divider circuit 832 having multiple states, responsive to a time-to-adjust signal 853, to generate an adjusted 1.024 MHz signal 834. The multiply (by 3) circuit 840, responsive to the multiple states of the divider circuit 832, takes the logical OR of three of the multiple states (See FIG. 20), to generate the adjusted 3.072 MHz signal 850. The divider circuit 42, responsive to the adjusted 3.072 MHz signal 850, generates the transmit clock signal 862, wherein the transmit clock signal is one-sixty-fourth of the rate of the adjusted 3.072 MHz signal 850. The divider circuit 836, responsive to the adjusted 1.024 MHz signal 834, generates the time-to-adjust signal 853. The divider circuit circuit 832 is responsive to the time-to-adjust signal 853 to generate the adjusted 1.024 MHz signal 834. The divider circuit 842 generates the transmit clock timing signal 862.

Now referring to FIG. 20, the numbers 1–10 indicate states of the divider (by 8, 9, 10) circuit 832 (shown in FIG. 19) during each repetition of the divider (by 8, 9, 10) circuit 832 operation. As previously mentioned, the phase lock loop 808 (FIG. 17) and jitter integrator (not shown) of the slave unit 802 dictate the particular divider value to be employed at any instance by the divider (by 8, 9, 10) circuit 832. Thus, the numbers 1–10 symbolize various states of the divider (by 8, 9, 10) circuit 832 according to the particular divider value then being employed. As also previously mentioned, in the example of a 9.216 MHz clock input signal 806 (shown in FIG. 19) of the slave unit from its crystal (not shown), the nominal divider is the value 9, and adjustment is made to compensate for jitter by periodically dividing by any of the values 8, 9, or 10, as appropriate, in attempts to maintain that nominal frequency. In any instance, then, the divider (by 8, 9, 10) circuit 832 will have states 1–8 and additionally will have state 9 when 9 is the divider value and states 9 and 10 when 10 is the divider value of the divider (by 8, 9, 10) circuit 832.

The CTREN signal 834 symbolizes the enablement of the counter (ctr7) block 836, once for each occurrence of the adjusted signal 834, i.e., nominal 1.024 MHz. In order to obtain the CTR6EN signal 850 that enables the counter (ctr6) block 842 (shown in FIG. 19) to yield the transmit clock signal 862, three states of the divider (by 8, 9, 10) circuit 832 are detected, states 2, 5, and 8. This detection is symbolized by arrows 852a–c. In order to obtain the CTR6EN signal 850, the detected states 852a–c are logically combined in a manner symbolized by the OR gate 854 of FIG. 20.

Figure 21:
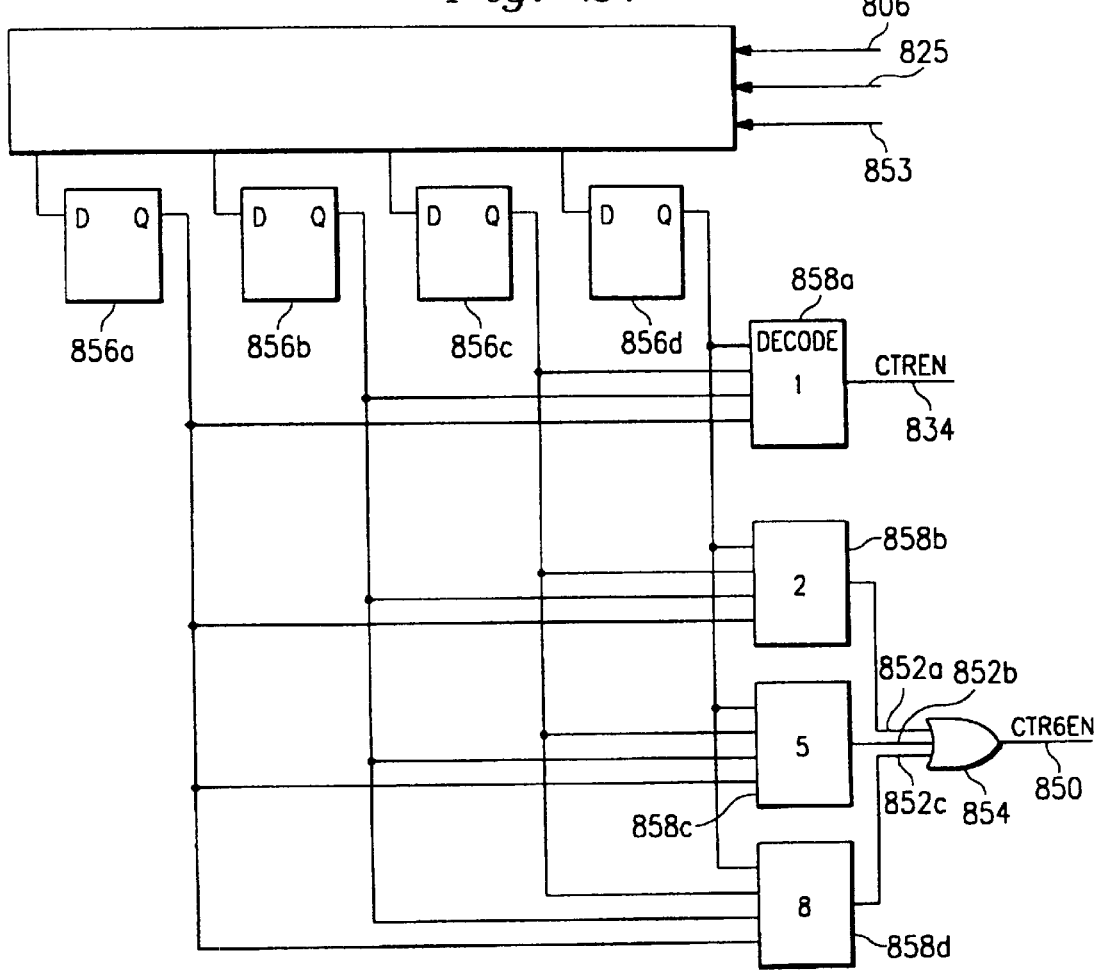
FIG. 21 is a simplified illustration of the divider (by 8, 9, 10) circuit 832 of FIG. 19.

Now referring to FIG. 21, as the divider (by 8, 9, 10) circuit 832 (shown in FIG. 19) repeats each repetition of operation, three output states are decoded from the three detected states 852a–c (shown in FIG. 20). One state in each repetition of the divider (by 8, 9, 10) circuit 832 is decoded and given to the counter (ctr7) block 836 (shown in FIG. 19). Three other states, however, in each repetition of the divider (by 8, 9, 10) circuit 832 are provided to the counter (ctr6) block 842 (shown in FIG. 19) to perform the multiply by 3. In effect, the divider (by 8, 9, 10) circuit 832 is decoded at each of the three states 852a–c of each repetition.

The divider (by 8, 9, 10) circuit 832 is illustrated in FIG. 21. The divider (by 8, 9, 10) circuit 832 detects the down and up adjustment indicators (previously discussed with respect to FIG. 17) from the phase lock loop 808 (and a jitter integrator, if present). Based on these down and up adjustment indicators, the divider (by 8, 9, 10) circuit 832 employs a particular divider, either 8, 9, or 10. The value 9 is employed when the recovered clock signal 809 timing is the same as that dictated by the master unit, the value 8 is employed when the master unit dictates a speed up of the timing of the recovered clock signal 809, and a 10 value is employed when the master unit dictates a slowing of the timing of the recovered clock signal 809. The divider (by 8, 9, 10) circuit 832 also receives a control indicator 853 which means "make desired adjustment now". The indicator 853 controls activation of the actual "make desired adjustment now" function so that adjustments are made only at a single state of the control (ctr7) block 836 (for example, upon the registering of the rising edge of the CLK8K signal 860). In this manner, the adjustment of signals 862, 860 and 834 is made only once during the period of the 8 kHz frame synchronization clock CLK8K 860,which period is the same time frame as six periods of the transmit clock signal CLK48K 862. Thus, the transmit clock signal 862 is adjusted once every six of its periods, during one of the six periods. The five other periods of the transmit clock signal 862 during which adjustment is not made are each of a uniform duration, without jitter. Adjustments made to timing of the transmit clock signal 862, as described, are relatively small in comparison to the periods of the signal 862, for example, $\frac{1}{9.216}$ MHz or 108 ns. In the prior configuration shown in FIG. 17, the phase lock loop has typically made much larger adjustments such as $\frac{1}{16}$ or $\frac{1}{32}$ of the 48K period, i.e., 1.302 μs or 651 ns.

The one state related to the CTREN signal 846 and the three detected states 852a–c are each decoded in a conventional manner. Four flip flops 856a–d are employed as counters. Through conventional synchronous logic design, those skilled in the art will be able to determine the functions necessary to drive the flip flops 856a–d in order to make a count in the desired manner. Outputs of Q's of the flip flops 856a–d are then decoded by decoders 858a–d. From the decoders 858b–d, appropriate values indicative of the detected states 852a–c are obtained. The decoded states 852 are then logically OR'd in the OR gate 854 to obtain the CTR6EN signal 850.

Referring back to FIG. 19, the result of obtaining the transmit clock signal 862 by derivation from the adjusted signal 834, rather than from the recovered clock signal 809, is that the transmit clock signal 862 need not be adjusted for jitter at each period of the transmit clock signal 862. This is the case because the resulting transmit clock signal 862 is obtained directly from the adjusted signal 834, not by use of the phase lock loop 808 of the slave unit 802 (shown in FIG. 17), as in the prior schemes. The adjusted signal 834 is already adjusted via use of the phase lock loop 808 and jitter integrator (if present) to compensate for jitter, and the transmit clock signal 862 is derived from the already adjusted signal 834. Furthermore, through this approach, substantial jitter effects are not exhibited by the transmit clock signal 862 because only one adjustment is made in six periods. This results in smoother transmit timing, as well, because fewer adjustments are actually made to obtain the transmit clock signal 862.

Figure 22:
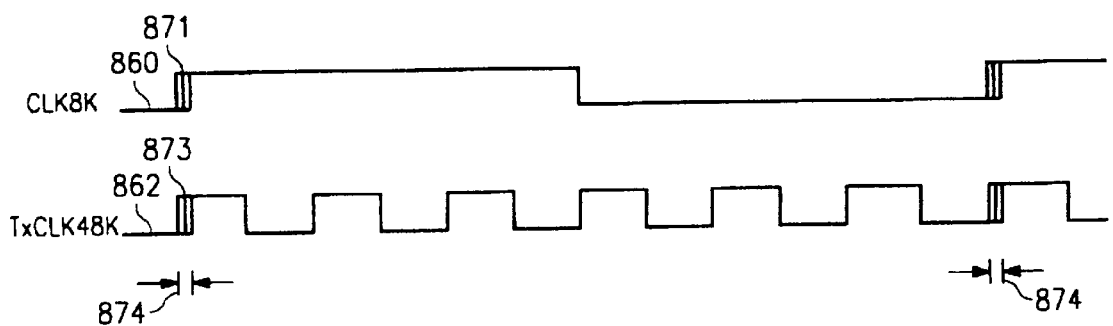
FIG. 22 is an illustration of waveforms of a receive clock signal 820 of FIG. 18 slaved to a master, and a transmit clock signal derived from the adjusted received clock signal in order to effect slaving of the transmit clock signal with the master.

Now referring to FIG. 22, an 8 kHz frame synchronization clock CLK8K signal 860, and a transmit clock signal waveform 862, derived according to the preferred embodiment, are shown. In each period of the CLK8K signal 860, an adjustment 871 to allow the signal 860 to track the timing of the master is made in the manner previously described. Because the transmit clock signal waveform 862 is derived from the adjusted signal 834 (shown in FIG. 19) rather than from the recovered clock signal RXCLOCK 809 (shown in FIG. 17) as in the conventional schemes, an adjustment 873 to compensate for jitter is made only every sixth period of the transmit clock signal waveform 862. The range 874 of the adjustments 871 and 873 is smaller than the range 824 of the prior schemes (shown in FIG. 18).

An additional benefit of this preferred embodiment is that it produces an 8 kHz voice frame synchronization clock CLK8K signal 860 with very little jitter. The CLK8K signal 860 is used to control signal processing at a rate slaved to the master communications unit (not shown), for example as a frame clock for digital signal processing of speech signals. Because digital signal processors must typically process a fixed series of instructions each frame, varying the frame rate introduces a complication in the processing, particularly in sensitive operations such as sampling for decimation or interpolation. Reducing the variation of the period of the frame clock reduces the tolerance required of the digital signal processor to accept time-varying frame rate and therefor results in a simplification of the digital signal processor compared to the prior art.

Other external interfaces of the system control functions circuit 40 may include interrupt signals, such as the /INT0 258 and the /INT1 signal 282 which are each indicative of the status of internal interrupts from the interrupt controller 144. Finally, the baseband chip 22 may include certain external interfaces for mode selection by a mode selector 292. The external interfaces to the mode selector 292 may include a MODE0 pin 294 and a MODE1 pin 296. The mode selector 292 provides for four possible modes because of the two pins 294, 296. One mode is the execution by the microcontroller 130 of code that is resident in memory (not shown) contained within the chip 22, such as a mask-programmable ROM, possibly, a 12 kbyte memory. Another of the possible modes may allow for microcontroller 130 execution of code from a memory (not shown), such as ROM external to the chip 22. Yet another mode may disable the microcontroller 130 completely and attach all the external interfaces 214, 216, 218, 220, 222, 223, 225 of the microcontroller 130 to an in-circuit emulator for code development or other purposes. A fourth mode may be a test mode, for example, to allow production testing of the chip 22 at various stages of manufacture. Of course, the modes could provide other possibilities.

Beyond these, other external interfaces of the baseband chip are possible and may be appropriate in certain applications. The particular external interfaces specifically described here are intended to be understood as examples only and other such interfaces may be possible.

The Internal Interfaces

Continuing to refer to FIG. 4, internal interfaces between the circuits 44, 42, 40 of the baseband chip 22 and between the protocol functions circuit 44 and the radio 24 (shown in FIG. 2) may be discussed. In general, there are four primary "internal" interfaces to the protocol functions circuit 44. Each of those interfaces connects with the frame formatter 112 of the protocol functions circuit 44. The four interfaces are: (1) a radio interface 114, connecting the frame formatter 112 with the radio 24 (shown in FIG. 2) of the telecommunications unit 20 or 20' (also shown in FIG. 2); (2) a FIFO/codec interface 128, connecting a FIFO element of the frame formatter 112 with a codec 124, such as an ADPCM codec, of the audio functions circuit 42; (3) an interrupt interface 146, connecting the frame formatter 112 with the interrupt controller 144 of the system control functions circuit 40; and (4) a microcontroller interface 140, connecting the frame formatter 112 with a microcontroller 130 of the system control functions circuit 40. These four internal interfaces with the frame formatter 112 of the protocol functions circuit 44 enable operations of the baseband chip 22 when a frame format, such as, for example, a multiple logical channel format like the format 30 (shown in FIG. 4, and hereinafter discussed) or some other format for transmitted and received data is employed in communications.

Turning now to discussion of each of the four interfaces 114, 128, 146, 140 in greater detail, particular aspects and characteristics of the interfaces 114, 128, 126, 140, as they operate to enable desirable communications utilizing a frame format, for example, the format 30 shown in FIG. 4, may be better understood. Beginning with discussion of the radio interface 114, the radio interface 114 includes a transmit TXBB) line 26 and a receive (RXBB) line 28. These lines 26, 28 allow the baseband chip 22 to communicate baseband signals with the radio 24 (shown in FIG. 2) of the cordless telecommunications unit 20 or 20', as the case may be (FIG. 2). The baseband signals may be communicated according to a desirable frame format therefor, such as, for example, the three logical channel format 30 (FIG. 3). The lines 26, 28 may, for example, be configured to operate in a serial manner.

Turning now to the microcontroller interface 140, the microcontroller interface 140 directly connects the microcontroller 130 with certain registers (not shown in detail) of the frame formatter 112. Those registers may be supplied with certain information by the microcontroller, via the microcontroller interface 140. The information maintained in those registers may be used at the frame formatter 112 to control the formatter 112 operation. Software may, for example, cause the microcontroller 130 to write certain values to the registers. Those values, then, control the formatter 112 operations. The values may dictate the start of transmission, the synchronization pattern to be detected, the data to be transmitted over certain logical channels, or other matters at the formatter 112.

Now addressing the interrupt interface 146, the interrupt interface 146 directly connects the interrupt controller 144 with the frame formatter 112. The frame formatter 112 may pass interrupt signals on status bits to the interrupt controller 144 over the interrupt interface 146. The interrupt signals and status bits passed over the interrupt interface 146 may serve a variety of purposes, as those skilled in the art will know and appreciate. Certain particular reasons those signals and bits may be sent by the formatter 112 to the interrupt controller 144 may include, for example, to indicate conditions of signals at the radio interface 114 or other conditions or matters.

Now referring to the FIFO/codec interface 128, the FIFO/codec interface 128 serves to interface a FIFO element (not shown in detail) of the frame formatter 112 with the codec 124, which, for example, may be an adaptive differential pulse code modulator (ADPCM) codec. The FIFO/codec interface 128 provides for passage of data, for example, B-channel 32 data, between the FIFO element of the formatter 112 and the codec 124. (The FIFO/codec interface 128 is shown in FIG. 4 and discussed below.) Such data may be passed both ways across the FIFO/codec interface 128. The FIFO element, in such embodiment, may serve as a buffer between the codec 124 and the frame formatter 112. The FIFO element may also, according to certain embodiments, accept clock timing adjustment information from the frame formatter 112. Based on such information, the FIFO element may enable corrections to the internal clocks generated by the formatter 112. Corrected internal clocks may, for example, be passed over the FIFO/codec interface 128 to the codec 124 and employed to keep the chip 22 synchronized.

Figure 23:
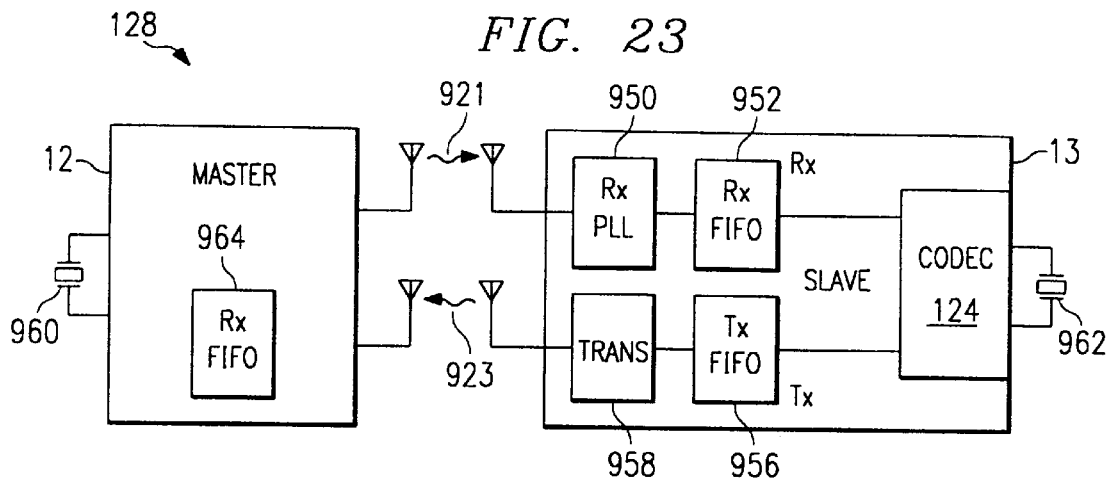
FIG. 23 is a simplified illustration of two units 12, 13 of the communications system 11 of FIG. 1, wherein the base set unit 12, serves as a master for timing of the system, and the hand unit 13, serves as a timing slave to the master.

Referring to FIG. 23, a digital cordless telephone comprises two communications units, the base unit 12, and the hand unit 13. The telephone is synchronized by making the base unit 12 behave as a master for timing and the hand unit 13 as a slave to the timing of the master. In practice, the master and slave units may be any communications units of a communications system and either of the units 12, 13 could be the master and the other the slave.

The hand unit 13 consists of basic communications elements, such as a receive signal phase lock loop 950 for locking onto a receive signal 921 to the hand unit 13 from the base unit 12. The hand unit 13 also includes a receive FIFO buffer 952 for receiving the receive signal 921 detected by the phase lock loop 950. A codec 124 of the hand unit 13 makes data from the receive FIFO buffer 952 available for use by the hand unit 13. Data from the codec 124 passes to a transmit FIFO buffer 956 of the hand unit 13 and on to a transmitter 958 of the hand unit 13. The transmitter 958 transmits signals from the hand unit 13 to the base unit 12. The base unit 12 includes corresponding components to the hand unit 13, or other similar components that enable communications between the units 12, 13.

Each of the base unit 12 and the hand unit 13 has its own internal crystal, crystal 960 and crystal 962, respectively. The respective crystals 962, 960 of the units 13, 12 provide internal timing for operations of the units 13, 12. In order to achieve synchronization for communications between the base unit 12 and hand unit 13, however, the hand unit 13 is slaved to the timing of the base unit 12. This is accomplished through communications of timing signals by the base unit 12 to the hand unit 13, as received signal 921. In the synchronization arrangement, the transmit timing of the hand unit 13 may be derived from the receive signal 921 in such a manner that the transmit timing for transmit signal 923 is also a slave of the timing of the base unit 12.

Figure 24:
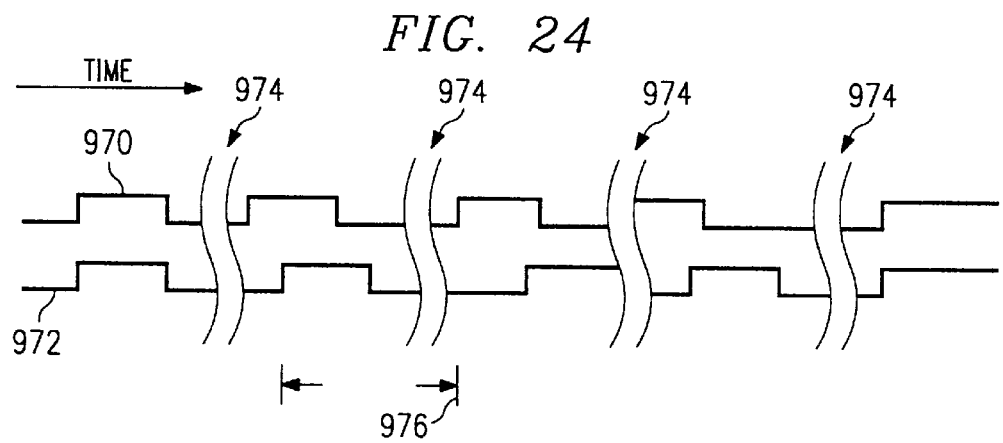
FIG. 24 is an illustration of waveforms of timing of the master and slave units of FIG. 23, showing intermittent fades and resulting offset due to drift of one waveform in relation to the other.

Referring to FIG. 24, an illustrative master timing waveform 970 and slave timing waveform 972 are shown. Over time various fades 974 may interrupt the waveforms 970, 972. When so interrupted, the base unit 12 and hand unit 13 each revert to operation in accordance with the internal timing of the unit 12, 13 derived from the applicable system crystal 960, 962. As fades 974 occur, the synchronization of timing between the base unit 12, as master, and the hand unit 13, as slave, drifts. These drifts result in offsets 976 of the master timing waveform 970 and slave timing waveform 972. Over time, the drift may be so great that the offset 976 of master timing waveform 970 or slave timing waveform 972 is at least as great as a complete cycle of one of the waveforms 970, 972.

For purposes of example, the slave timing waveform 972 is illustrated in FIG. 24 as being slower than the master timing waveform 970. Being slower, the offset 976 may increase such that the master timing waveform 970 completes a cycle that has not been initiated by the slave timing waveform 972. In that instance, the missed cycle of the slave unit, the hand unit 13, will, therefore, never occur. As those skilled in the art will readily appreciate and understand, the reverse situation could be true as well, depending upon which of the master unit or the slave unit has a faster internal clock from its respective crystal 962, 960.

In any event, loss of a timing cycle by either of the master or slave unit results in the underflow or overflow of data in the respective unit 12, 13. An underflow of receive data at the hand unit 13 results in the codec 124 attempting to handle data that is not available at the receive FIFO buffer 952 of the hand unit 13. Alternatively, an overflow situation of the receive FIFO buffer 952 may occur if the timing of the hand unit 13 is slow compared to the base unit 12. In that instance of overflow, then the base unit 12 as master will have its receive FIFO buffer 964 underflowing because the hand unit 13 is slow and has not transmitted as much as the base unit 12 expected.

Figure 25:
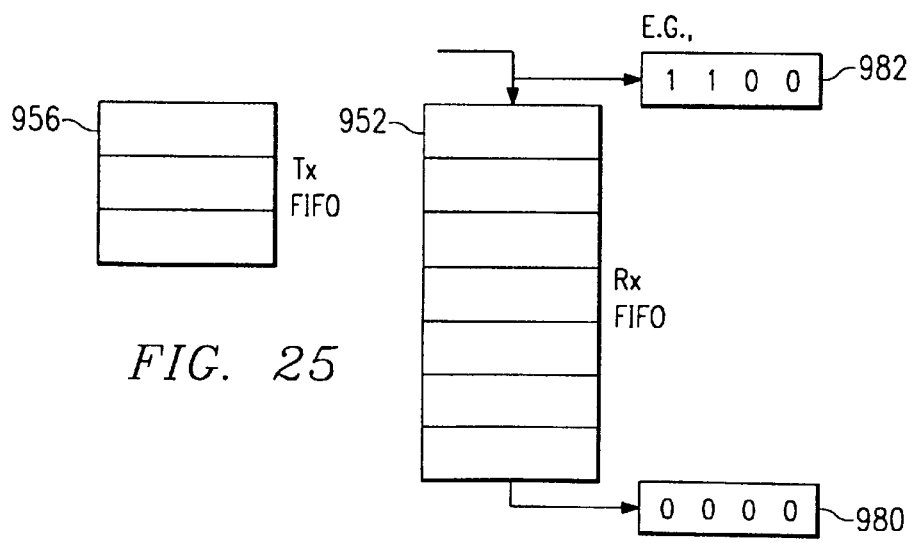
FIG. 25 is an illustration of FIFO operation in the event of an overflow or underflow resulting from offset between master and slave timing of a complete frame.

Referring now to FIG. 25, the receive FIFO buffer 952 operation in the event of underflow or overflow at the hand unit 13 is illustrated. The transmit FIFO buffer 956 of the hand unit 13 is maintained without underflow or overflow that would result in loss of communicated data. This is accomplished by inserting an insert data word 980 of the FIFO buffer 952 if there is an underflow at the receive FIFO buffer 952 or discarding a discard data word 982 from the FIFO buffer 952 if there is an overflow at the receive FIFO buffer 952.

According to embodiments of the invention, when an insert data word 980 is inserted because of underflow, that word 980 consists solely of zeros. Such an insert data word 980 is considered a null by the hand unit 13 circuitry and does not invoke particular operations of the hand unit 13 in response. Thus, no change in the state of the hand unit 13 results from such a null insert data word 980.

In the case of overflow of the receive FIFO buffer 952, a discard data word 982 is discarded to prevent overflow. Although the discarding of the discard data word 982 results in loss of some data, that loss is minimal and of no significance when the data is communications data, such as voice information in the instance of the digital cordless telephone. In any event, the loss of the data of a single discard data word 982 from time to time is insignificant in comparison to the loss of a complete timing cycle which could otherwise result, as previously described. The loss of a timing cycle or gain of a timing cycle at the hand unit 13 does not impede operations according to the preferred embodiment of the invention, and only the single null insert data word 980 is inserted or the discarded discard data word 982 is discarded, resulting in little or no disruption of receipt and transmission of communications data between the units 12, 13.

Further discussing the codec 124, the codec 124 serves to convert analog audio data to digital data bits, for example, an ADPCM codec may, upon the conversion, yield 32 kbps ADPCM data bits, and vice versa. The codec 124 may be responsive to a muting signal serve to mute the receiver unit 20 or 20', as the case may be, under conditions of detected bit errors in the ADPCM voice path. The codec 124 may also allow real-time read-only access to the voice path to facilitate hands-free operation. In such operation, the microcontroller 130 may interact with the programmable voice path gain stages and thereby control chip 22 operations in accordance therewith.

The Frame Format

Referring to FIG. 3, pursuant to these embodiments of the interfaces 114, 128, 140, 146 of the frame formatter 12 of the baseband chip 22, a multichannel data format, for example, the format 30, may be transmitted and received by the frame formatter 12 in a desired manner. The multichannel data format, for example, the format 30, may comprise several distinct logical channels, such as, in the case of the format 30, three logical channels. In the example format 30, the three logical channels are: a transparent voice B-channel 32, an error-control, packetized control D-channel 34, and a framing synchronization SYN-channel 36. Such a three channel format 30 may be followed in communications between the baseband chip 22 (FIGS. 2 and 3) and the radio 24 (FIG. 2) of a cordless telecommunications unit 20 (FIG. 2). That three channel format 30 could also be followed in RF communications units 20, 20' (FIG. 2), such as, for example, the base unit 12 and the hand unit 13 of a digital cordless telephone (FIG. 1).

In the case of the particular frame format 30, each such format 30 comprises an initial SYN-channel 36 of data which contains a fixed synchronization pattern (not shown) for timing recovery and frame alignment. The SYN-channel 36 data allows the receiving radio 24 (shown in FIG. 2) to synchronize with the frame formatter 12 during transmission, and the frame formatter 12 to synchronize with the radio 24 during reception. The D-channel 34 is control data for non-audio, system communications. The B-channel 32 is audio data, such as voice data.

Further with respect to the particular frame format 30, the format 30 may be 96-bits at a bit rate of about 48 kbps. Within each such 96-bit frame format 30, those bits exist in the three channels, i.e., the SYN-channel 36, the D-channel 34, and the B-channel 32. Of those channels 36, 34, 32, the SYN-channel 36 comprises a programmable 12-bit sequence transmitted consecutively once per 96-bit frame. Transmission may be so consecutive to facilitate robust frame synchronization between units 20, 20'. As for the B-channel 32, it comprises sixteen 4-bit ADPCM words, and four associated parity bits for the purpose of allowing for detection and response to bit errors in the received voice B-channel 32 signal. The SYN-channel 36 data is employed by units 20, 20' in synchronizing the units 20, 20'. The particular criteria for acquisition and loss of synchronization of the units 20, 20', by virtue of the SYN-channel 36 information, is a programmable parameter. The microcontroller 130 may configure the parameter for optimal operations with respect to linking appropriate units 20, 20' for legitimate communications therebetween and tolerating temporary radio 24 fades.

The Frame Formatter

Now referring to FIGS. 1–4, in conjunction, the frame formatter 12 of a unit 20 receives data streams of the form of a format, such as a multichannel format, for example, the frame format 30, and then determines the transmission rate of the received data stream. Once the transmission rate is determined, each of the SYN-channel 36 data packet, the D-channel 34 data packets, and the B-channel 32 data packets are extracted and registered by the frame formatter 112. The frame formatter 112 also delivers data streams of the form of a format, such as the frame format 30, to the radio 24 of the unit 20 when transmitting to another unit 20'.

In operation of the frame formatter 112, voice and control data to be transmitted from the radio 24 (shown in FIG. 2) is assembled, formatted, and emitted and digital receive data from the radio 24 is channeled into separate voice and control streams. Those separate voice and control data streams are herein sometimes referred to as the B-channel 32 data and D-channel 34 data, respectively. Through the frame formatter 112, transmit signals and receive signals may be simultaneous, rather than multiplexed, if so desired.

The frame formatter 112, through the four interfaces 114, 128, 140, 146, may thereby integrate with the baseband chip 22 and the radio 24 to accomplish desired receptions and transmissions, both of the form of the frame format 30, by the telecommunications unit 20. In particular, the FIFO/codec interface 128 provides an avenue for the B-channel 32 data received over RF by the unit 20 to pass from the frame formatter 112 to the codec 124 for modulation and also an avenue for the B-channel 32 data encoded at the codec 124 to pass to the frame formatter 112 for formatting and delivery to the radio 24 for RF transmission by the unit 20. As for the microcontroller interface 140 and interrupt interface 146, each provide for complementary activities directed to overall baseband chip 22 control. For example, the D-channel 34 data may be passed over the microcontroller interface 140 from the microcontroller 130 as instructions to the frame formatter 112 for baseband chip 22 transmit and receive operations. The interrupt interface 146, in similar fashion, may serve for passage of interrupt signals from the frame formatter 112 to the interrupt controller 144 upon the existence of conditions at or detected by the frame formatter 112 which dictate changes at the microcontroller 130, such as, for example, software or hardware errors and others. As is apparent from FIG. 4, the interrupt controller 144 and microcontroller 130 are operatively intertwined to provide desired operations of the baseband chip 22. Those skilled in the art will know and appreciate the various possibilities for operations under this and other configurations of those components by virtue of the interfaces 114, 128, 140, 146.

The Microcontroller

Referring back to FIG. 4, the primary component of the system control functions circuit 40 is the microcontroller 130, which interfaces externally as previously described. The microcontroller 130 also interfaces internally with the interrupt controller 144 via two interrupt signal paths, /INT0 signal 280 and /INT1 signal 282. Another internal interface of the microcontroller 130 is with the CPUCLK signal 256 from the clock generator 248. The CPUCLK signal 256 provides timing clock signals for operation of the microcontroller 130 and, thus, the baseband chip 22. The microcontroller 130 interfaces outside the system control functions circuit 40 but internally within the baseband chip 22 to the protocol functions circuit 44 at the frame formatter 112 of that circuit 44.

Although various types of microcontrollers could be employed in the embodiments of the invention, one suitable microcontroller 130 is some member of the 8051 family of microcontrollers. Those skilled in the art will know and understand the standard 8051 family architecture and instruction set and will know that there are many other possible variations, all suitable for the embodiments. A particular microcontroller, the Advance Micro Devices 80C32T2 (herein 8032), may be particularly suited to application as the microcontroller 130 of the embodiments. Certain enhancements may be made to that particular 8032 model to meet the special needs of the cordless telephone environment, however, those enhancements are within the knowledge and capabilities of those skilled in the art.

Software and Transmit and Receive Operations

Software is important to control of the baseband chip 22 through the microcontroller 130 operation. Software may be provided to the chip 22 through internal and/or external memories. All operations of the chip 22, as dictated by the microcontroller 130, depend on the particular software driving the operations.

The following describes a transmit operation and a receive operation with a device, according to the embodiments of the present invention. The telephone includes a base unit 20 and a hand unit 20', designated 20 and 20' only for purposes of example. The software of the hand unit 20' is responsible for initiating a transmit communication if the user decides to initiate such communication. In a receive communication scenario, the hand unit 20' detects a communication generated by the base unit 20 when the base unit 20 receives a communication from another device over a connected system 11 (shown in FIG. 1).

To initiate a transmit communication, then, the hand unit 20' may begin from an idle, low power use mode. In that mode, the microcontroller 130 issues a control signal to the clock generator 248 to place and maintain the unit 20 in a low power state. The unit 20 must, therefore, be awakened. Awakening the unit 20 may be accomplished, for example, by a user who picks up the hand unit 20' and presses a button, such as an on/off button on the hand unit 20'. Of course, other means of awakening the baseband chip 22 are possible, such as, for example, mere removal of the hand unit 20' from its cradle or others according to design. In any event, in embodiments of the invention, the wake-up signal is detected through the parallel ports Port-4 230 and Port-5 232. This detection causes an interrupt to propagate through the interrupt controller 144, and the interrupt controller 144 causes the chip 22 to wake up to an active state. At that point, the microcontroller 130 may begin to evaluate the source of the interrupt.

In evaluating the source of the interrupt, the microcontroller 130 may inquire of the interrupt controller 144 what caused the interrupt. The interrupt controller 144 may then respond with an answer, such as, for example, that the interrupt resulted from the key scanner which is detected, as previously mentioned, through the parallel ports, particularly Port-4 230 and Port-5 232. Then, the microcontroller 130 may go about determining which key of the keypad detected by the keypad scanner (not shown) was pressed, and, if the key was pressed, that the on/off key was the particular key. If there is no on/off key in the device, the microcontroller 130 would, nonetheless, detect in similar fashion that the unit 20' was activated to awaken.

Although other embodiments are possible, it is a possibility that such a wakening of the chip 22 itself causes the hand unit 20' to link over RF (i.e., an RF link 17 shown in FIGS. 1–2) to the base unit 20. In that case, the microcontroller 130 may send commands to the frame formatter 112 over the interface 146, signaling the frame formatter 112 to initiate a call. The microcontroller 130 may also through that interface 140 send certain data and that data will be transmitted by the frame formatter 112 on the TXBB line 26.

Additionally, the microcontroller 130 may send commands to, for example, Port 6 thereby turning on the radio 24 so that transmissions by the radio 24 are possible. Thereafter, the microcontroller 130 may wait for an acknowledgment from the base unit 20, which acknowledgment would be received by the baseband chip 22 of the hand unit 20' through the RXBB line 28.

When the handset unit 20' receives the acknowledgment message back from the base unit 20, an interrupt may be triggered and propagated through the interrupt controller 144 to the microcontroller 130. That interrupt signals the microcontroller 130 that an active RF link 17 has been established between units 20, 20'. Thereafter, the microcontroller 130 may begin taking key entries for a number that is to be transmitted and which corresponds to another device, for example, the corded telephone 14 (shown in FIG. 1), to connect over the system 11.

The microcontroller 130 may collect the key entries in several ways. For example, the microcontroller 130 may collect numbers from the key scanner in the parallel ports 230, 232, and 234 and then transmit the collected numbers as data over the RXBB pin according to the particular frame format 30 of the units 20, 20'. The format 30 then transmitted by the hand unit 20' may notify the base unit 20 of the key that has been depressed. At the base unit 20, the transmission will be received and read. The base unit 20 then determines that the particular keypad number corresponding to the depressed key dictates a particular DTMF tone. The base unit 20 will then transmit those tones.

Another possibility for informing the base unit 20 of the depressed key at the hand unit 20' is for the microcontroller 130 to directly signal the codec 124. The codec 124 may then generate the DTMF tones that correspond to the key that was pressed and send those over the voice channel. The base unit 20, in that scenario, is not involved in the transmission.

After the depressed keys are transmitted by the hand unit 20' to the base unit 20 over the RF link 17 set up between the units 20, 20', the PSTN or other system 11 carries the transmitted information indicative of the keys depressed in order to make a connection with a another telecommunications device, such as the corded telephone 14 (FIG. 1). The PSTN will send a ring that is conducted back to the base unit 20, hand unit 20', and through the earpiece (not shown) so the user will detect that the transmitted communication is in process and so that the voice B-channel 32 will be open. When the connection is made to the other device, a voice connection is established from the hand unit 20' through the base unit 20 to the other device over the system 11.

Now discussing receive operations by a telecommunications device, including the base unit 20 and the hand unit 20', a link set-up over the PSTN is initially made to the base unit 20. In that instance, the hand unit 20' may again be in an idle, low power consumption state. The hand set 20', however, wakes-up periodically, according to design of the wake-up timer 238 previously described. The periodic wake-up enables the hand unit 20' to check for any message from the base unit 20 if a call received by the base unit 20 is pending. So, in effect, the hand unit 20' awakens periodically at the end of some time period, for example, one second. Because the hand unit 20' will likely be programmed to wake up at shorter time intervals than the base unit 20 in order to save power, the base unit 20 may transmit continuously to the hand unit 20' for a longer time interval. When the hand unit 20' wakes up as it normally would do periodically, the hand unit 20' turns on its radio 24 (shown in FIG. 2) and will detect any message coming in from the base unit 20 over the RF. The base unit 20 will be detected by the radio 24 of the hand unit 20' and the detected signal delivered to the baseband chip 22 of the hand unit 20' over the RXBB line 28.

The received message will be interpreted by the microcontroller 130 to mean establish a link setup with the base unit 20, and the microcontroller 130 will go through the sequence of steps, in the manner previously described with respect to transmissions, to control the baseband chip 22 to set up the link. Those steps of the microcontroller 130, and activities of the baseband chip 22 in response to them, operate to set up a voice connection between the receive baseband signals reaching the RXBB line 28 and the transmit baseband signals transmitted from the TXBB line 26 and the audio transducers, connected at pins AIN 200 and pins AOP and AON 202, of the respective units 20, 20'.

In the course of link setups, certain data may be transmitted and received back and forth between the base unit 20 and the hand unit 20'. That identification data may serve to secure the RF communications between the base unit 20 and the hand unit 20', preventing the units 20, 20' from locking onto transmission signals of others also in communicating in the RF. The identification data may be stored in an electronically erasable PROM, for example, that is interfaced with the synchronous serial port 284 through pins SDIN 288, SDOUT 290, SCLK 286.

Multiple variations, changes and modifications are possible in the aforementioned embodiments of the invention described herein. Although certain illustrative embodiments of the invention have been shown and described here, a wide range of modification, change, and substitution is contemplated in the foregoing disclosure and, in some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A digital cordless telecommunications unit for receiving analog receive voice signals and transmitting analog transmit voice signals and for transmitting digital baseband transmit signals and receiving digital baseband receive signals, comprising:
   (a) an audio functions circuit, comprising:
      (i) an audio front end circuit;
      (ii) an adaptive differential pulse code modulator (ADPCM) codec connected to the audio front end circuit;
      (iii) a FIFO buffer coupled to the codec adapted for storage of data words received from an external device and output of the data words to the codec, the FIFO buffer including means for determining if there is overflow of data words in the buffer and means for discarding a data word from the buffer in response to the overflow, and thereby avoiding a disruption of synchronous communication;
   (b) a systems control functions circuit, comprising:
      (i) a microcontroller;
      (ii) a memory accessible by the microcontroller;
      (iii) an interrupt controller connected to the microcontroller;
      (iv) parallel ports connected to the interrupt controller;
      (v) a wake-up timer connected to the interrupt controller;
      (vi) a reset circuit;
      (vii) a clock generator connected to the microcontroller; and
   (c) a protocol functions circuit comprising a frame formatter for determining and extracting digital receive voice signals and digital receive control signals from the digital baseband receive signals and combining digital transmit voice signals and digital transmit control signals to form the digital baseband transmit signals.

2. The digital cordless telecommunications unit of claim 1, wherein the audio front end circuit receives the analog receive voice signals and transmits the analog transmit voice signals.

3. The digital cordless telecommunications unit of claim 2, wherein the frame formatter combines the digital transmit voice signals and the digital transmit control signals and extracts the digital receive voice signals and the digital receive control signals according to a predetermined ratio, the predetermined ratio being optimized for ADPCM data.

4. The digital cordless telecommunications unit of claim 3, wherein the codec converts the analog receive voice signals to the digital transmit voice signals and converts the digital receive voice signals to the analog transmit voice signals.

5. The digital cordless telecommunications unit of claim 4, wherein the microcontroller controls a baseband chip according to the digital receive control signals and wherein the memory stores at least a portion of the digital receive control signals.

6. The digital cordless telecommunications unit of claim 3, wherein the predetermined ratio uses buffering between the ADPCM codec and the frame formatter.

7. The digital cordless telecommunications unit of claim 3, wherein the digital baseband transmit signals and digital baseband receive signals each comprise a plurality of frames of digital voice data and digital control data and wherein the predetermined ratio defines a single frame having sixteen bits of digital control data for every sixty eight bits of digital voice data.

8. The digital cordless telecommunications unit of claim 1, wherein the FIFO buffer further comprises:
(a) means for determining if there is an underflow of data in the buffer; and
(b) means for adding a null data word to the buffer when underflow is detected.

9. The digital cordless telecommunications unit of claim 8, wherein the wake-up timer comprises a counter, an R-C circuit, and a multivibrator, the multivibrator comprising two inverters, one flip flop, and one driver circuit.

10. The digital cordless telecommunications unit of claim 9, wherein the reset circuit comprises:
(a) a battery monitor having an output for indicating a charge state of a battery;
(b) a watchdog timer having an output for indicating an operational state of software operating on the baseband chip; and
(c) reset logic connected to receive the battery monitor output and the watchdog timer output and having a reset output, wherein the reset logic generates a reset signal on the reset output if either the battery monitor output or the watchdog timer output is active.

11. The digital cordless telecommunications unit of claim 10, wherein the parallel ports comprise an array of switches, and further comprise:
(a) weak logic high drivers on the outputs of the columns of the array;
(b) weak high pull-ups on the inputs of the rows of the array; and
(c) in parallel with the weak high pullups, input buffers comprising Schmitt trigger inverters.

12. The digital cordless telecommunications unit of claim 11, further comprising a first internal clock, wherein the clock generator comprises:
(a) an adjuster, for adjusting a receive data signal from a second telecommunications unit, to obtain an adjusted receive clock signal that tracks the receive data signal;
(b) an accumulator, connected to the adjuster, for accumulating the adjustments made by the adjuster;
(c) first means, connected to the accumulator, for applying the adjustments accumulated to vary the first internal clock in order to slave the first internal clock to a second internal clock of the second telecommunications unit, so as to obtain an adjusted signal that is the adjusted and slaved first internal clock; and
(d) second means, connected to the first means, for deriving a transmit clock from the adjusted signal.

13. A baseband device for use with a digital cordless telecommunications unit, the baseband device comprising:
an audio interface for externally transmitting an analog audio signal;
a digital interface for receiving a digital baseband data signal, wherein the digital baseband data signal includes a voice channel and a control channel;
a protocol functions block connected to the digital interface and including a frame formatter for receiving the digital baseband data signal, the frame formatter comprising means for repeatedly extracting control data bits and digital voice data bits from the control channel and voice channel, respectively, of the received digital baseband data signal, wherein the control data bits and digital voice data bits are interleaved at a rate optimized for 32 kilobit per-second adaptive differential pulse code modulator (ADPCM) data;
an audio functions block connected to the audio interface and to the protocol functions block, the audio functions block comprising an ADPCM codec for receiving the digital voice data from the frame formatter and converting the digital voice data to the analog audio signal to be transmitted by the audio interface;
a FIFO buffer coupled to the codec adapted for storage of data words received from an external device and output of the data words to the codec the FIFO buffer including means for determining if there is overflow of data words in the buffer and means for discarding a data word from the buffer in response to the overflow, and thereby avoiding a disruption of synchronous communication; and
a system control function block including a microcontroller for controlling certain features of the baseband device and an interrupt controller connected between the microcontroller and the protocol functions block for receiving the control data from the frame formatter and controlling operation of the microcontroller in response thereto.

14. The baseband device of claim 13, wherein:
the audio interface also receives a second analog audio signal;
the digital interface also drives a transmit digital baseband data signal;
the ADPCM codec of the audio functions block also converts the second analog audio signal into a transmit digital voice data and supplies the transmit digital voice data to the frame formatter;
the microcontroller of the system control function block also supplies a transmit control data to the frame formatter; and
the frame formatter also repeatedly interleaves bits of the transmit digital voice data with bits of the transmit control data, at a ratio adapted to the supply of the transmit digital voice data to the frame formatter, to form the transmit digital baseband data signal.

15. The baseband device of claim 14, wherein the frame formatter determines and extracts the control data and digital voice data from the received digital baseband data signal by utilizing framing synchronization data supplied in the received digital baseband data signal.

16. The baseband device of claim 15, wherein the frame formatter adapts to multiple formats of the received digital baseband data signal.

17. The baseband device of claim 14, wherein the system control function block further comprises:
a clock connected to the microcontroller;
a parallel data port connected to the microcontroller;
a wakeup timer connected to the interrupt controller;
a serial data port connected to the interrupt controller.

18. The baseband device of claim 14, wherein a portion of the transmit control data from the microcontroller is used to control the operation of the frame formatter when forming the transmit digital baseband data signal.

19. The baseband device of claim 14, wherein the audio interface, the digital interface, the protocol functions block, the audio functions block and the system control function block reside on a single silicon substrate.

20. A method for interfacing transmit and receive digital baseband data signals with transmit and receive analog audio signals for use in a digital cordless telephone, comprising the steps of:

- determining and extracting a receive control data and a receive digital voice data from the receive digital baseband data signal according to a synchronization data provided in the receive digital baseband data signal and according to an interleaving pattern optimized for adaptive differential pulse code modulator (ADPCM) codec data;
- storing data words received from an external device in a FIFO buffer:
- determining if there is an overflow of data words in the buffer:
- discarding a data word from the buffer in response to overflow, thereby avoiding a disruption of synchronous communication;
- outputting data words from the FIFO to the codec;
- supplying the receive digital voice data to an ADPCM codec;
- converting the receive digital voice data to the transmit analog audio signal with the ADPCM codec;
- supplying the receive control data to a microcontroller to instruct the microcontroller to control predetermined features of the digital cordless telephone;
- converting the receive analog audio signal to a transmit digital voice data with the ADPCM codec;
- supplying the transmit digital voice data to a frame formatter;
- supplying a first and second transmit control data from the microcontroller to the frame formatter; and
- combining the first transmit control data and the transmit digital voice data in the frame formatter according to the second transmit control data and according to the interleaving pattern to form the transmit digital baseband data signal;
- wherein the receive control data instructs the microcontroller by requesting interrupts of the microcontroller; and wherein the frame formatter adapts to multiple formats of the receive digital baseband data signal.

21. A digital cordless telecommunications unit for communicating analog receive and transmit voice signals and for communicating digital baseband receive and transmit signals between a base unit and a portable unit, comprising:

- an analog front end and an adaptive pulse code modulator (ADPCM) codec, the analog front end and the ADPCM codec adapted to process the analog receive and transmit voice signals;
- a frame format circuit adapted to format signals and to enable synchronous communications between the base unit and the portable unit;
- a system control functions circuit including a microcontroller arrangement and adapted to control the communications between the base unit and the portable unit;
- a memory circuit adapted to buffer data between the analog front end and the ADPCM codec, wherein, in response to an overflow of data in the memory circuit, at least one data word is discarded from the memory circuit and in response to an underflow of data in the memory circuit, at least one data word is inserted to the memory circuit.

22. A digital cordless telecommunications unit for communicating analog receive and transmit voice signals and for communicating digital baseband receive and transmit signals between a base unit and a portable unit, comprising:

- an analog front end and codec means for modulating and demodulating data, the analog front end and the codec means adapted to process the analog receive and transmit voice signals;
- means for formatting the voice signals and digital baseband signals and for enabling synchronous communications between the base unit and the portable unit;
- means, including a microcontroller arrangement, for controlling the communications between the base unit and the portable unit;
- a memory circuit adapted to buffer data between the analog front end and the codec means, wherein, in response to an overflow of data in the memory circuit, at least one data word is discarded from the memory circuit and in response to an underflow of data in the memory circuit, at least one data word is inserted in the memory circuit.

* * * * *